(12) United States Patent
Novik et al.

(10) Patent No.: US 7,440,985 B2
(45) Date of Patent: Oct. 21, 2008

(54) FILTERED REPLICATION OF DATA STORES

(75) Inventors: Lev Novik, Bellevue, WA (US); Michael R. Clark, Issaquah, WA (US); Yunxin Wu, Kirkland, WA (US); Douglas B. Terry, San Carlos, CA (US); Irena Hudis, Bellevue, WA (US); Tomas Talius, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 11/380,579

(22) Filed: Apr. 27, 2006

(65) Prior Publication Data

US 2006/0190572 A1 Aug. 24, 2006

Related U.S. Application Data

(63) Continuation-in-part of application No. 10/631,591, filed on Jul. 31, 2003.

(51) Int. Cl.
G06F 17/30 (2006.01)
(52) U.S. Cl. ............... 707/204; 707/205; 709/219; 709/203; 709/220
(58) Field of Classification Search ............... None
See application file for complete search history.

(56) References Cited

U.S. PATENT DOCUMENTS

| | | | |
|---|---|---|---|
| 6,704,925 B1 | 3/2004 | Bugnion | |
| 6,757,896 B1 | 6/2004 | Cohen et al. | |
| 6,928,467 B2 * | 8/2005 | Peng | 709/219 |
| 6,949,023 B1 | 9/2005 | Okubo et al. | |
| 2002/0165724 A1 | 11/2002 | Blankesteijn | |
| 2003/0182327 A1 * | 9/2003 | Ramanujam et al. | 707/204 |
| 2005/0015436 A1 * | 1/2005 | Singh et al. | 709/203 |
| 2005/0027755 A1 | 2/2005 | Shah et al. | |
| 2005/0027817 A1 | 2/2005 | Novik et al. | |
| 2005/0044187 A1 | 2/2005 | Jhaveri et al. | |
| 2005/0044530 A1 | 2/2005 | Novik | |
| 2005/0055352 A1 | 3/2005 | White et al. | |
| 2005/0086272 A1 | 4/2005 | Novik et al. | |
| 2005/0097225 A1 | 5/2005 | Glatt et al. | |
| 2005/0125621 A1 | 6/2005 | Shah | |
| 2005/0177617 A1 | 8/2005 | Banginwar et al. | |
| 2005/0198453 A1 | 9/2005 | Osaki | |
| 2005/0203972 A1 | 9/2005 | Cochran et al. | |
| 2005/0210081 A1 | 9/2005 | Fleck et al. | |
| 2005/0235019 A1 | 10/2005 | Yang | |
| 2005/0237231 A1 | 10/2005 | Liao | |

OTHER PUBLICATIONS

Nuno Preguiça et al., "Flexible Data Management for Mobile Enviornments", 1999.
Daniela Bourges-Waldegg et al., "The Fluid Computing Middleware: Bringing Application Fluidity to the Mobile Internet", Proceedings of the 2005 Symposium on Applications and the Internet (SAINT'05), 2005.
Authorized Officer: Sun Dong Guk; International Search Report; Jul. 20, 2007; 3 pages; KIPO; Republic of Korea.

* cited by examiner

Primary Examiner—Cam Y Truong
Assistant Examiner—Belinda Xue
(74) Attorney, Agent, or Firm—Microsoft Corporation

(57) ABSTRACT

Methods for enabling mult-master synchronization of particular sets of data using filters. In a synchronization request, data including knowledge and filters may be supplied. A response may comprise data including changes that are identified by the filter and that have versions that are not known by the requestor.

14 Claims, 15 Drawing Sheets

EXCEPTION LIST ─ 608

POINTWISE MAXIMUM

| | | | D10 ─ 710 |
|---|---|---|---|
| K= | A5 | B1 | C5 |
| | +A7 | +B2 | C6 } 712 |
| | +A8 | +B3 | C7 |
| | +A9 | +B4 | C8 |
| | +A10 | +B6 | |
| K= | A5 | B4 | C8 D10 ─ 714 |
| | +(A7:A10)+B6 ─ 716 | | |

FIG. 7C

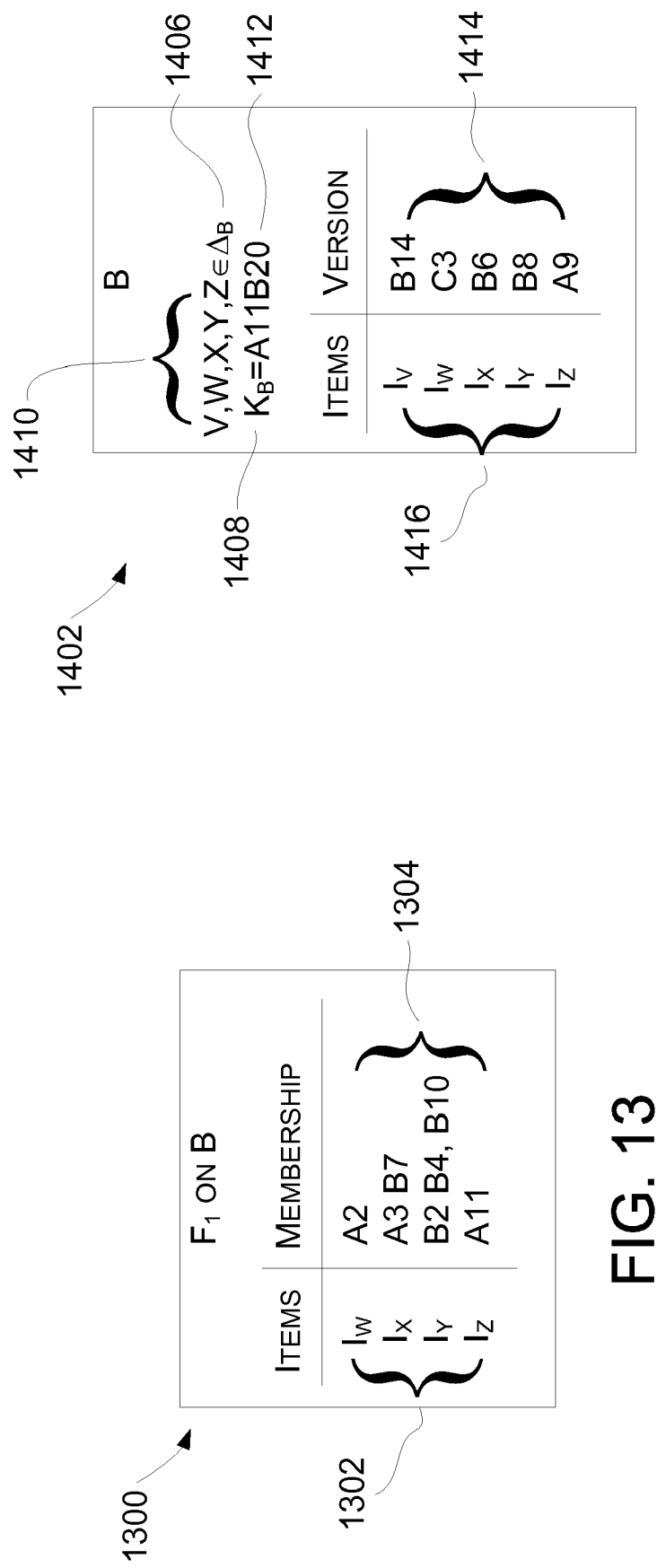

FIG. 16

ITEMS AT T₁ — 1602

| ITEMS | COLOR | VERSION |
|---|---|---|
| $I_X$ | GRN | A2 |
| $I_Y$ | BLUE | B5 |
| $I_Z$ | GRN | B3 |

ITEMS AT T₂ — 1604

| ITEMS | COLOR | VERSION |
|---|---|---|
| $I_X$ | GRN | A2 |
| $I_Y$ | GRN | A10 |
| $I_Z$ | BLUE | B8 |

FIG. 17

FILTER JUST AFTER T₁ — 1702

| ITEMS | MEMBERSHIP |
|---|---|
| $I_X$ | A3 |
| $I_Z$ | A4 |

FILTER JUST AFTER T₂ — 1704

| ITEMS | MEMBERSHIP |
|---|---|
| $I_X$ | A3 |
| $I_Y$ | A11 |
| $I_Z$ | A4 A12 |

FILTERED REPLICATION OF DATA STORES

CROSS-REFERENCE TO RELATED APPLICATIONS

This application is a continuation-in-part of U.S. patent application Ser. No. 10/631,591, filed Jul. 31, 2003, which is incorporated by reference herein in its entirety.

BACKGROUND

In today's world of digital information handling, individuals may store information or data using a variety of different devices and in a variety of different locations. Often a user stores the same information in more than one device or location. In many cases, such a user would like all of their various data stores to have the same information without having to manually input the same changes into each data store. Replication, or synchronization, of data is one process used to ensure that each data store has the same information.

For example, a user may maintain an electronic address book or a set of email messages in a myriad of different devices or locations. The user may maintain the address book or email addresses, for example, on a desktop computer in a data store accessible using personal information manager software, on their laptop computer, on a personal digital assistant (PDA) or mobile phone, using an on-line contacts manager or email management web site, and the like. The user may modify the contact information or send/receive email addresses using applications associated with each location. Regardless of where or how a change is made, one goal of replication is to ensure that a change made on a particular device or in a particular location is ultimately reflected in the data stores of the other devices and in the other locations.

One common replication method involves tracking changes that have occurred subsequent to a previous replication. For example, a device that seeks to replicate with another device may submit a request for changes to the other device. Ideally, the changes that the other device sends are those that have occurred since the last replication. The device, or "replica," that responds to a request for updated information may check for any changes that are time stamped subsequent to a previous replication. Any changes with such a time stamp may then be sent to the device requesting replication. Typically such replication requires that each replica be aware of the other replicas or the replication topology in which it is operating. Each replica may also need to maintain a record of what changes have been replicated on other replicas. In effect, each replica may need to maintain information about what it believes is stored on the other replicas within the topology.

The challenges of replication become more complicated when more than two replicas are included in the same sync community or topology. Among these challenges are problems involving replacing more current data with outdated data based on the order devices are replicated, replicating data that may already be in sync, and having data that is in sync be reported as being in conflict.

As one example, consider a sync community that includes three replicas. A user updates replica 1 at time 1. At time 2, the same data is updated in replica 2. Replica 2 then replicates with replica 3 and the changes made in replica 2 are incorporated into replica 3. If replica 3 subsequently receives changes from replica 1, the data originally updated on replica 2 may be replaced with the original data from replica 1, even though the change from replica 1 is not the most recent change.

In some cases, communication resources may be wasted when replicas incorrectly believe that their information is out of sync, and so perform unnecessary sync operations. For example, suppose in the three replica sync community introduced above that a user updates replica 1. The changes in replica 1 are then replicated to replica 2. Replica 2 then replicates its changes to replica 3 so that the information from replica 2, which is currently also the information from replica 1, is changed on replica 3. Replica 3 then replicates with replica 1. In some cases, replica 3 may know that replica 1 has been updated, but not know the version of information on replica 1. Because of this, replica 3 may replicate its information to replica 1, even though the same information is already on replica 1. Further, additional needless replications may continue as replica 1 replicates with replica 2 or performs other pair-wise replications at subsequent times.

In some cases, replicated data may actually appear as being in conflict, even when it is not. For example, consider again a three replica sync community. The information on replica 1 is updated and replicated to replica 2. The information on replica 1 is then replicated to replica 3. Replicas 2 and 3 then attempt a replication only to discover that they each have changes (from the replication with replica 1) that have occurred since their last replication. Even though the changes are the same, replicas 2 and 3 may think they are in conflict.

Another set of problems may occur when it is desirable to only replicate part of the data in a data store at a particular time. For example, suppose the data store includes email messages in various folders, including an inbox folder and some number of other folders including, perhaps, folders that contain saved email messages. In some cases a user might want to replicate changes to all of the email folders. For example, this might be desirable when the communications bandwidth between replicating devices is large. In other cases—perhaps when the bandwidth is limited, as it might be at some times with a mobile phone or PDA—the user might only want to replicate changes to particular folder, like their inbox.

It is also conceivable that a user might want to synchronize only part of their entire set of data in all cases. For example, a user might want to maintain all email on a desktop computer or server, but only synchronize their inbox and a selected set of folders to a small device that has limited storage. In this case, some information may never be synchronized with a particular device.

As another example, consider a data store that includes digital music files. In some cases, a user might want to synchronize their entire digital music library—perhaps they have a portable music player or computer with a large hard drive. They may also have a small portable music player with a limited amount of flash memory, on which they only want to store a selected set of music. In one example, this music to be synchronized might include, say, digital music files they have rated with "four stars" or "five stars," as well as music downloaded in the last week.

When synchronizing a particular set of data, like in the situations introduced above, various additional problems may occur. For example, data may fit the criteria of a filter and be in a desired set of data at one time or on one device, but not fit the criteria and so not be in the desired set of data at another time or on another device. Additionally, each replica may need to continue to maintain an understanding of the data it has synchronized from different devices, even when that data may, for example, be a subset of the full set of data during some synchronizations, and the full set of data during other synchronizations.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various technologies and techniques directed to the filtered replication of data. More particularly, described herein are, among other things, systems, methods, and data structures that facilitate the replication of particular sets of data, identified by "filters," between replicas. A filter identifies, in part or in whole, a particular set of data that is replicated between replicas.

In some implementations of the filtered replication systems and processes described herein, a replica that desires changes from another replica may transmit a "knowledge value" and some data that identifies or specifies a filter to the other replica. The knowledge value may represent the changes that the first replica knows of—has knowledge of—and the filter may represent a particular set of the data about which the first replica desires changes. In this example, the second replica may identify the changes it will transmit to the first replica by comparing the version of changes it has with the changes known by the first replica, where the changes are also in the filter provided by the first replica. Any changes that the second replica identifies that are both not known by the first replica and that are specified by the filter may then be transmitted to the first replica.

In other implementations of the systems and processes described herein, a first replica may receive changes from a second replica—for example, the changes might be determined by a process like that described in the previous paragraph. The first replica may then incorporate the changes into its data store.

In yet other implementations of the systems and processes described herein, a single replica may operate as both a sender of changes and a receiver of changes.

DESCRIPTION OF THE DRAWINGS

FIG. 7A illustrates an embodiment of updating knowledge in a replica using an exception list.

FIG. 7B illustrates an embodiment of updating knowledge in a replica using a pairwise maximum of knowledge vectors.

FIG. 7C illustrates an embodiment of updating knowledge in a replica where exceptions exist in the updated knowledge.

FIG. 13 illustrates a set of example list membership data that might be used in a filtered replication scenario that uses a list-based filter.

FIG. 14 illustrates an exemplary embodiment of item version information.

FIG. 16 illustrates example data for a property-based filter, to demonstrate a technique called list materialization.

FIG. 17 illustrates example list membership data for an exemplary list-based filter generated by materializing a property-based filter for particular items.

DETAILED DESCRIPTION

Figure 2:
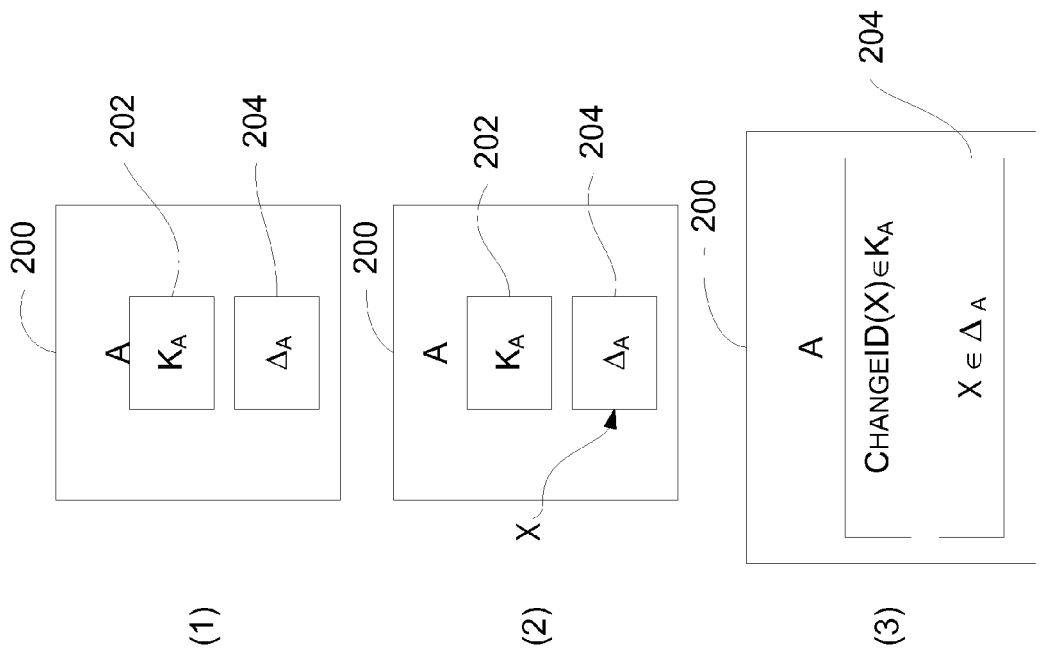
FIG. 2 illustrates how changes may be managed in a replica.

The present invention extends to various technologies and techniques directed to the filtered replication of data. Replication typically occurs among a group of participating replicas that form a sync community. The total membership of the sync community does not necessarily need to be known to any given replica at any given time. The topology of the sync community is also not necessarily known to any given replica at any given time. In the context of this application, the topology of a sync community may be an arbitrary graph in which the nodes of the graph are replicas and the edges between nodes represent possible synchronization relationships. Each replica in the sync community has an ID, which is a global unique identifier (GUID) in one embodiment.

In some embodiments, each change may be associated with a "change ID," which may be a pair that contains the ID of a replica and a version associated with that change. For example, the change ID "A10" might indicate that the change was performed or associated with replica "A" and that the version associated with the replica, perhaps assigned by replica A, is "10."

Each replica maintains "knowledge" that facilitates efficient replication. In some embodiments, knowledge is metadata that represents the changes of which the particular replica is aware. In such an embodiment, other replicas may be relieved from tracking what any other particular replica already knows, as this information may be effectively represented by the knowledge maintained by each replica.

Knowledge may be stored or represented in a variety of ways. Generally a representation of knowledge, however formed or designed, may support the following operations: (1) addition of a change to the representation of knowledge, (2) evaluation of whether a change is included in the representation of knowledge, and (3) combination of two representations of knowledge together, to form a single representation of knowledge.

As it is sometimes advantageous to concisely represent the changes of which a particular replica is aware, in some embodiments, knowledge is represented as a vector of pairs or change IDs where each pair or change ID is the ID of a replica and a maximum version associated with that change. Such a representation may be referred to as a "knowledge vector." For example, if a replica is aware of all changes made by a replica A from a first change to a tenth change, and all changes made by a replica labeled B from a first change to a fifth change, the replica might have a knowledge vector of A10B5, which might indicate that the replica is aware of all changes corresponding to change IDs A1 to A10 and all changes corresponding to change IDs B1 to B5.

A replica that wants to synchronize its data with another replica—that is, a replica that wants to receive any changes it does not have from another replica—may first provide its knowledge to the other replica. To reduce the amount of data representing knowledge that must be sent between replicating replicas, the knowledge may be expressed as a knowledge vector as previously described. Thus, the knowledge that is sent between the replicas does not need to include every change ID, but may be in the form of a vector that represents a number of change IDs. The other replica may use the knowledge it has received from the first replica to enumerate any changes it has that the first replica does not, and then send any such changes back to the first replica. The first replica may then evaluate whether any of the received changes conflict with any changes it maintains and then incorporate any changes it deems appropriate or valid (perhaps those that are non-conflicting) into its data store. The first replica may also update its knowledge representation so that knowledge representation includes the new changes it has received.

For the purposes of much of the discussion in this specification, replication may be considered to be one-way, as it was introduced in the previous paragraph. That is, a single replication may transfer changes from one replica to another. To accomplish a replication between two replicas so that both replicas have changes from the other replica, two one-way synchronizations or replications may be performed, in parallel—i.e., at the same time—or synchronously, one after the other. In other implementations, it may be advantageous for changes to only flow in one direction—a replica may incorporate changes from another replica but may never itself change the data in that other replica, for example—in which case one-way synchronizations may be sufficient.

Note that the number of pairs in a particular knowledge vector may change as replicas are added to or removed from the sync community. In addition, there is no requirement that the particular knowledge specifically contain a change ID for each replica in the sync community.

In some embodiments, a filter may also be specified or provided during a synchronization request. In the context of this application, a "filter" is any construct that serves to identify a particular set of items in a data store. During replication, the changes identified by the replica enumerating changes may then be filtered using the filter so that only changes that are identified by the filter are returned to the requester. For example, a very simple filter might specify "all items that are green." The changes returned to the requesting replica might then only include changes to items that are green. Changes to items that are not green might not be sent to the requester. While it may be common for a filter to identify a subset of items, it should be noted that in some cases a filter may identify the same set of data that would be identified without a filter—that is, the filter may not identify data that is truly a subset of the entire set of data. Continuing with the previous example where the filter specifies "all items that are green," if all of the items in the set of data happen to be green, then the data identified by the filter will include all of the items in the set, and the data identified by the filter won't be a true subset of the entire set of data. In addition, it should be noted that when a filter is said to "identify" a particular set of data, this does not mean that a filter must explicitly name, for example, particular items in a set of data or that particular items must always be explicitly listed or associated with the filter. In some implementations, a filter may identify particular items or changes using, for example, a query that does not reference any particular item explicitly, while in the same or other implementations a filter may use an explicit list of items, may use any combination of a query or explicit list, or may use any other construct that identifies or matches a particular set of items or changes in a data store.

Elements important to an understanding of filtered replication are described throughout this specification. The text associated with FIG. 8 through FIG. 19 is particularly relevant to the discussion of filtered replication contained herein, as these figures illustrate embodiments and examples that are specifically related to filtered replication of data.

Figure 1:
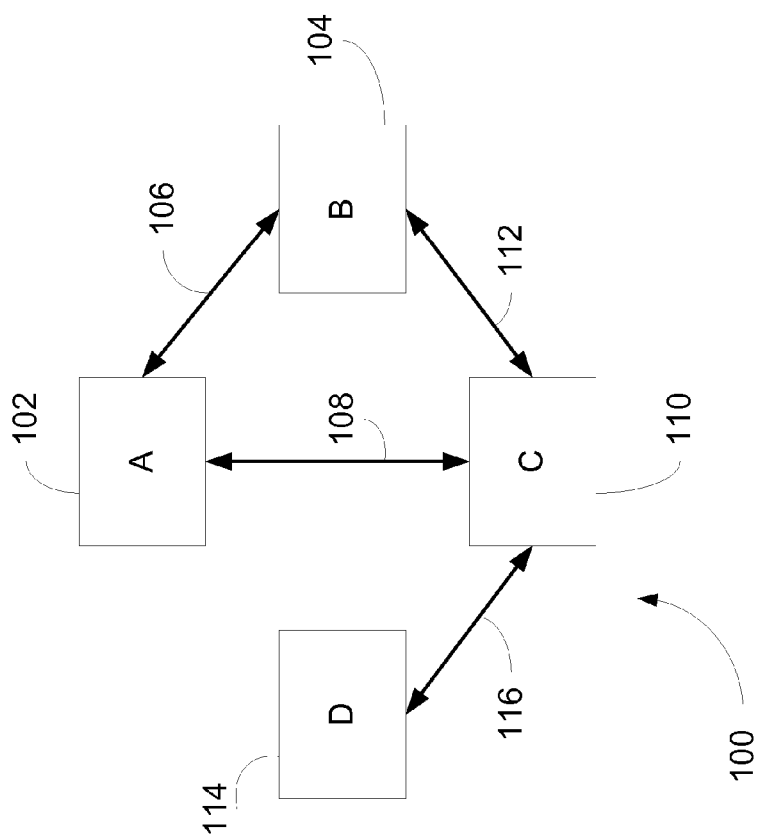
FIG. 1 illustrates an example sync community.

Turning now to FIG. 1, shown therein is one example of a sync community 100. The sync community 100 includes a number of replicas and is one example of an environment in which embodiments of the presently described technologies and techniques may be implemented. The replicas in the sync community 100 may represent various data stores or devices that may include, but are not limited to, computers, notebook computers, personal digital assistants, cellular telephones, other wireless devices, server computers, online services, and the like, or any combination thereof.

In FIG. 1, a replica A 102 may be electronically coupled to a replica B 104 through a communication link 106. The replica A 102 may be connected through a communication link 108 to a replica C 110. Replica C 110 may be connected to replica B 104 through a communication link 112. Replica C 110 may further be connected to a replica D 114 through a communication link 116. The illustrated communication links may be any kind of link that enables data to be exchanged between two computing devices, including wired links and wireless links.

In this sync community 100, although not all of the replicas are directly connected through communication links, changes in any of the replicas can be replicated to any of the other replicas within the sync community 100. For example, for the replica A 102 to be replicated with the replica D 114, replicas A 102 and C 110 may be replicated through the communication link 108. After such a replication, replica C 110 may include changes made on replica A 102. Replicas C and D may then replicate through the communication link 116, so that replica D 114 may incorporate changes from replica A 102. In this way, replica A 102 can replicate with replica D 114 without a direct link. In fact, replicas A 102 and D 114 may not even be aware of the existence of each other within the sync community 100.

Turning now to FIG. 2, shown therein is an embodiment that illustrates how changes may be managed in a replica. FIG. 2 shows a timewise progression of a replica A 200. Replica A 200 includes knowledge 202, in this case labeled $K_A$, and changes 204 in this case labeled $\Delta_A$. Each change in the changes 204 is the current data content of an item. A change may be a new item added to a replica even though no item was changed per se, the deletion of an item, and the like. Each of the changes 204 is associated with a version that in one embodiment of the invention is a change ID. Notably, one advantageous aspect of the invention is that there is no need to maintain a change log including information about previous changes. Rather, each replica includes knowledge and a database of changes (i.e. current items) where each change has a corresponding version.

At time (1), replica A 200 is in a steady state. At time (2), a user inputs a change labeled X into replica A 200. FIG. 2 shows the change X being added as a member of the changes 204. The knowledge 202 is updated to include a change ID, ChangeID(X), which is associated with the change X and identifies the addition of the change X to the changes 204. This embodiment illustrates one way in which changes to the replica are associated with specific change IDs.

The knowledge 202 represents the changes of which replica A 200 is aware, and may be implemented as a knowledge vector. In one embodiment, versions or change IDs are maintained for items or objects and such versions may be used to identify any items to be replicated. Alternatively, a log of changes may also be maintained.

Figure 3:
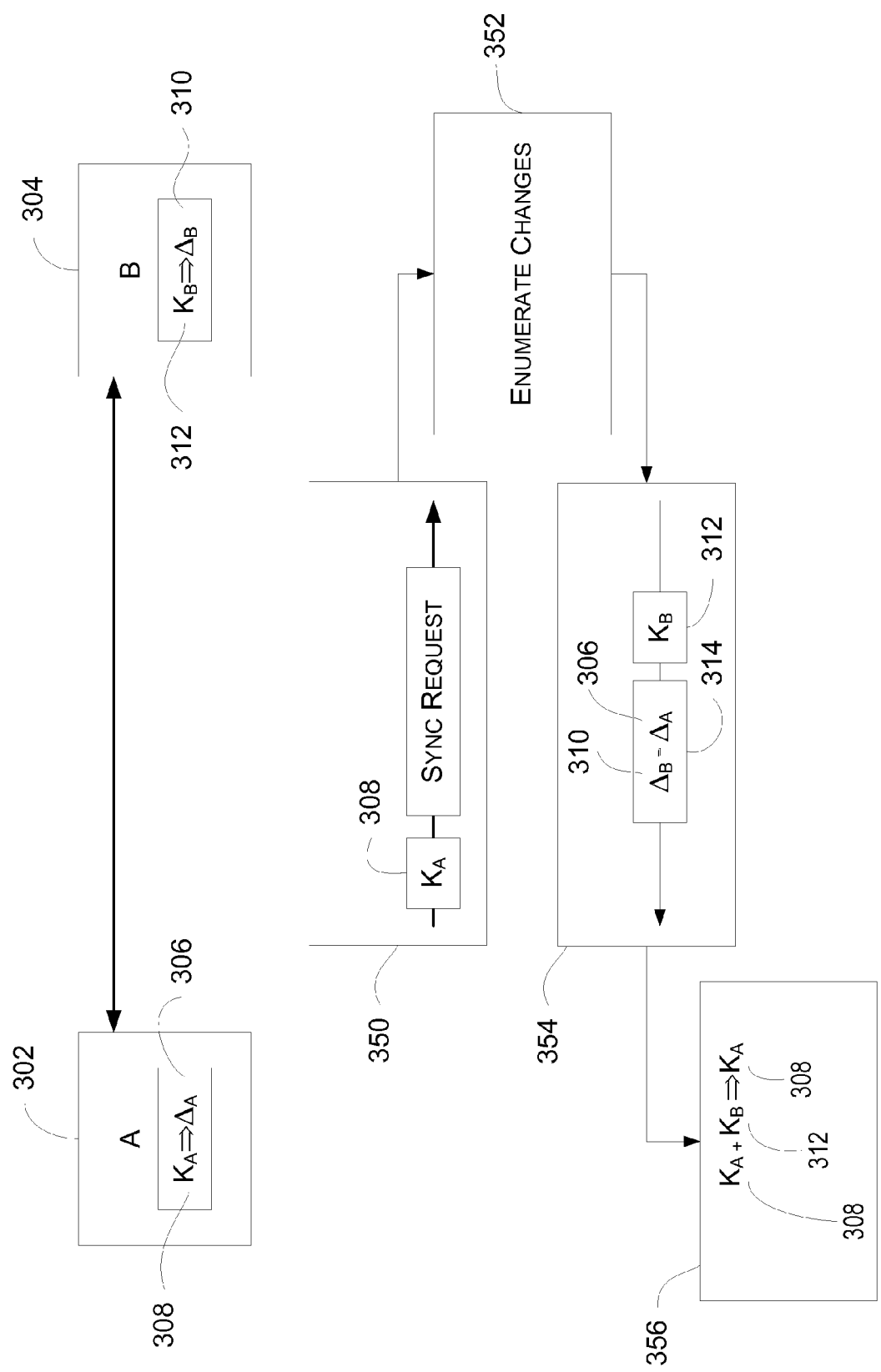
FIG. 3 illustrates an example of the use of knowledge to enumerate changes during replication.

Turning now to FIG. 3, shown therein is one example of the use of knowledge to enumerate changes during replication. It should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

FIG. 3 shows two replicas: replica A 302 and replica B 304. Replica A 302 includes knowledge 308, in this example labeled $K_A$. The knowledge 308 may includes a list of change IDs such as those described above. Replica A 302 further includes a set of changes 306, in this example labeled $\Delta_A$. Similarly, replica B 304 includes a knowledge 312 labeled $K_B$ and set of changes 310 labeled $\Delta_B$ and each associated with a change ID.

To begin the replication, in operation 350 at time 1, replica A 302 sends a sync request to replica B 304. The sync request includes replica A's knowledge 308.

In an implementation of operation 352, sometimes referred to as "change enumeration," Replica B 304 may then compare the knowledge 308 to the versions associated with each of the changes in its set of changes 310, and thereby make decisions about which of its changes 310 are already in replica A's changes 306 as well as the changes not present in replica A's changes. In another implementation, instead of examining each of the changes in replica B, replica B may compare the knowledge 308 to the version associated with each item maintained by replica B. Using either process, replica B may enumerate the changes of which replica A is not aware. For example, if the knowledge vector of replica A is A3B12 and replica B has current changes associated with versions that are change IDs B13 and B14, then the enumerated changes to be sent to the replica A might include those associated with the change IDs B13 and B14. In one embodiment, only B14 may be sent if the changes identified by B13 and B14 were made to the same item.

As a result, in operation 354 at time 2, replica B 304 may send to replica A 302 only the portion of replica B's changes 310 that are associated with versions that are not included in the knowledge 308 of replica A. These changes are illustrated using changes 314. In addition to the enumerated changes, replica B 304 may also send replica B's knowledge 312 to replica A 302.

In this example, replica A has knowledge of all of the changes that were originally in replica A, as long as those changes have not been superseded by the changes sent by replica B 304. In addition, replica B has sent all of the changes in replica B that were not already in replica A, so replica A also has information about all of the changes of which replica B 304 was aware. Therefore, in operation 356 at time 3, replica A may update its knowledge 308 to reflect the addition of the changes 314. In this case, this may be done simply by adding replica A's knowledge 308 to replica B's knowledge 312 and defining the result as the new value of replica A's knowledge 308. At this time, if not accomplished already, replica A may also incorporate any changes received from replica B.

Through this mechanism, an efficient replication is performed where only the needed changes are replicated and where the individual replicas are only required to maintain information about the changes that reside within the particular replica and previous changes about which the replica is aware.

In addition to enumerating changes, knowledge of a replica may also be used to detect conflicts between changes. This is a common task for replicas that have initiated a sync operation and received both changes and learned knowledge from another replica—the initiating replica may often then want to determine if any changes received from the other replica conflict with changes already in the replica. In this context, a conflict is defined as a change that was made without knowledge of another change. If a change was made with knowledge of another change, then the later change—the change made with knowledge of the other change—may be considered to be the definitive change and no conflict can be considered to have occurred.

Figure 4:
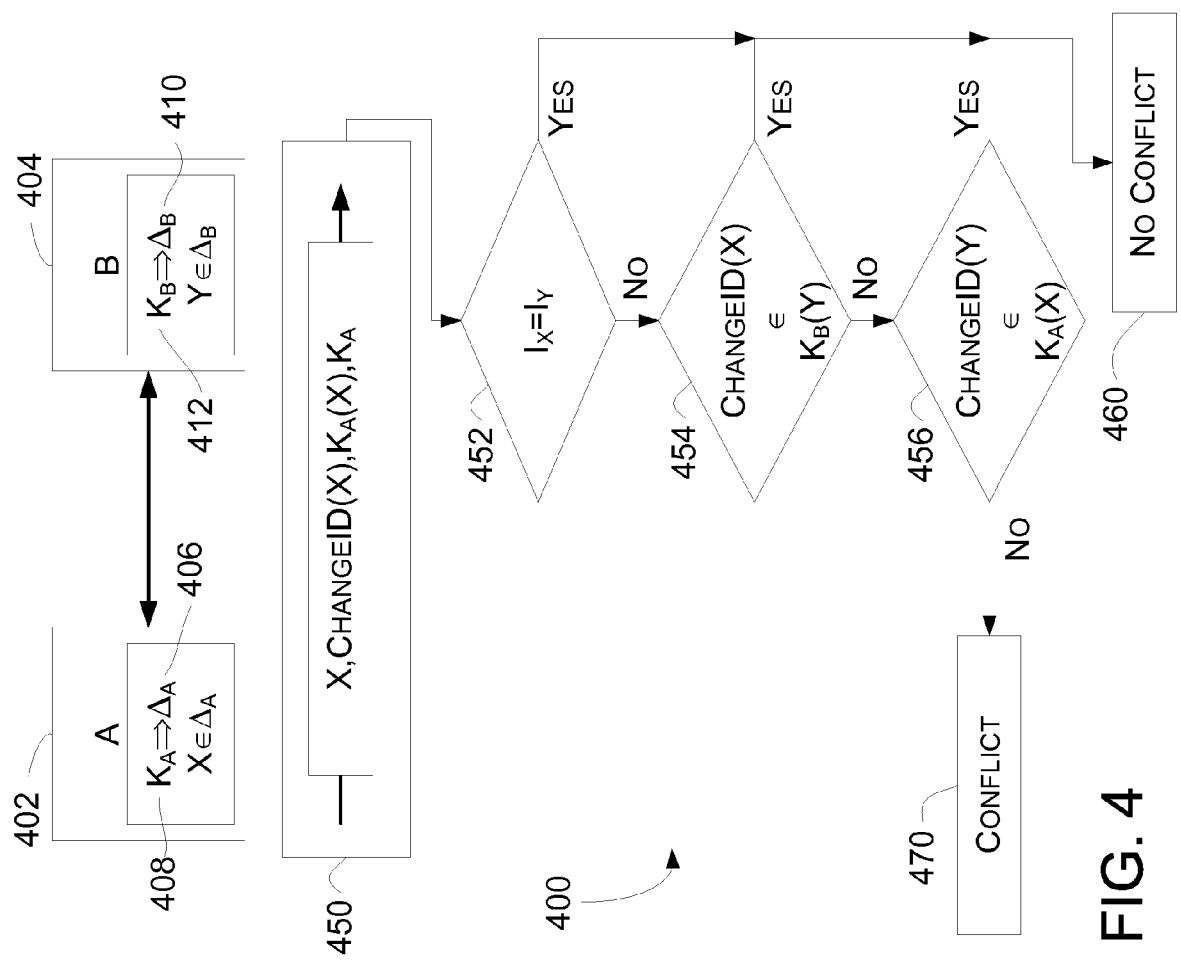
FIG. 4 illustrates an embodiment demonstrating how conflict detection may be accomplished.

Turning now to FIG. 4, shown therein is one embodiment demonstrating how conflict detection may be accomplished. The following description of FIG. 4 is made with reference to FIG. 3. However, it should be understood that the operations described with respect to FIG. 4 are not intended to be limited to being used with the elements illustrated by FIG. 3, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

FIG. 4 shows two replicas connected by a communication link. Replica A 402 includes knowledge 408 and a set of changes 406. As with the example in FIG. 3, the knowledge 408 may include a collection of change IDs associated with the changes 406 and associated with previous changes. Replica A further includes, for purposes of this example, a change to an item, where the change has been made in replica A. The change, labeled X, is a member of the changes 406. Similarly, replica B 404 includes knowledge 412, a collection of changes 410, and a change to an item, labeled Y, that is a member of the changes 410.

Illustratively, in operation 450 at time 1, replica A 402 sends change X to replica B 404. Associated and sent with change X are two other values: the change ID associated with change X, labeled ChangeID(X), and a made-with-knowledge value, labeled $K_A(X)$. The made-with-knowledge value may be the knowledge that existed in replica A 402 at the time change X was made in replica A 402. Alternatively, in some embodiments the made-with-knowledge may be the knowledge that exists in a replica when a change is sent. Replica A's current knowledge 408, in this example labeled $K_A$, may also be sent to replica B 404.

As shown in operation 452 at time 2, replica B 404 compares the item associated with change X—i.e., the item that changed when change X occurred—with the item associated with change Y. If change X and change Y correspond to different items, then there is no conflict, and the operational flow proceeds to operation 460.

If the changes refer to the same item, then further analysis is required to determine if the changes conflict. In operation 454 at time 3, replica B 404 checks to see if change X was already known to replica B when change Y was made in replica B. Like change X, change Y has an associated change ID, ChangeID(Y), and a made-with-knowledge value, $K_B(Y)$. If ChangeID(X) is a member of change Y's made-with-knowledge, $K_B(Y)$, then there is no conflict. In other words, if this is the case, then change Y was made in replica B with knowledge of the change X made in replica A 402. As such, the change Y now represents the most current and valid data for the replicas A and B. (Although not shown in the example illustrated by FIG. 4, at a subsequent time, change Y may be sent to replica A and the item associated with changes X and Y updated to change Y on replica A, perhaps in a fashion described in FIG. 3).

If the changes X and Y are for the same item, and ChangeID (X) does not appear in $K_B(Y)$, then the operational flow proceeds to operation 456. In this operation, at time 4, a check is done to see if change Y was known by replica A 402 when change X was made. This is a mirror to the operation performed in operation 454 and is typically done by checking to see if the change ID of change Y, illustrated as ChangeID(Y), is included in replica A's knowledge 408 at the time change X was made, $K_A(X)$. If ChangeID(Y) is a member of $K_A(X)$, then change X was made with knowledge of change Y and there is no conflict. In this case, change X is the most current and valid change for the particular item.

If the changes X and Y are for the same item, and ChangeID (Y) does not appear in $K_A(X)$, and ChangeID(X) does not appear in $K_B(Y)$, then a true conflict exists. In other words, in this case change X and change Y were made independently of each other. When a conflict is found, it may be reported and various conflict resolution rules may be applied to determine which change—X or Y—is kept. Such rules may include checking time stamps to determine which change was made most recently, always resolving conflicts in favor of certain type of replicas (such as those stored on servers) and/or any other suitable conflict resolution. Alternatively, in one form of conflict resolution, an item with conflicting changes may be updated such that conflicting changes are merged to form a new change.

Figure 5:
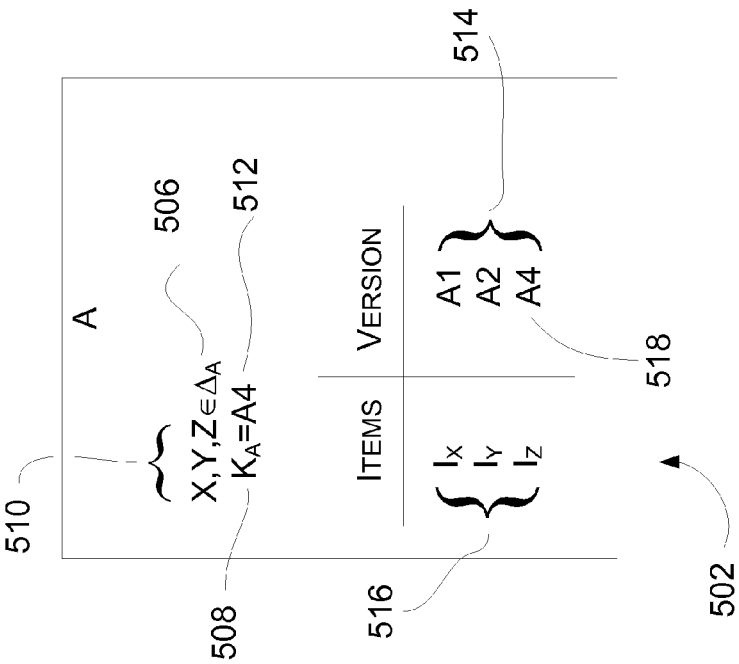
FIG. 5 illustrates an exemplary embodiment of change IDs and knowledge tracking.

Turning now to FIG. 5, shown therein is one exemplary embodiment of change IDs and knowledge tracking. FIG. 5 shows selected elements of a replica 502. These elements include a collection of changes 506 and knowledge 508. The collection of changes 506 includes several individual changes 510, in this example illustrated as X, Y, and Z. In this example, the present state of the knowledge of the replica is denoted by a knowledge vector 512 that in this case is A4. The knowledge vector 512 represents replica A's knowledge 508.

Also represented in FIG. 5 are a number of change IDs 514 associated with individual items 516. In this example, replica A 502 includes three changed items 516: $I_X$, $I_Y$, and $I_Z$. These items have corresponding changes 510 labeled X, Y, and Z. Using the change IDs, one can discern that the item $I_X$, with change ID A1, was changed in replica A at a first time, represented by the number "1." Item $I_Y$, with change ID A2, was changed in replica A at a time subsequent to when item $I_X$ was changed. And the item $I_Z$, with change ID A4, was changed in replica A at a time subsequent to when the item $I_Y$ was changed (and also subsequent to when item $I_X$ was changed). Change ID A3, though not illustrated directly in FIG. 5, may correspond to a previous change that, for example, was superseded by the change to item $I_Z$ labeled A4. In other words, item $I_Z$ may have been changed at time 3 and this change may have been accorded change ID A3. When item $I_Z$ was changed again at time 4, it was accorded change ID A4, which superseded change ID A3.

It is important to note the difference between the change ID A4, which in this example is associated with item $I_Z$, and replica A's knowledge vector 512, which is also labeled A4. In this example, replica A's knowledge vector of A4 signifies that replica A's knowledge 508 includes the changes corresponding to the change IDs labeled A4, A3, A2 and A1. That is, this knowledge vector includes the change represented by the change ID 518 that is the same as the knowledge vector, as well as all changes with the same replica ID that were made previous to the change ID 518 represented by the knowledge vector. In comparison, in the present example the change ID 518 labeled A4 only represents the change Z made to item $I_Z$.

Figure 6:
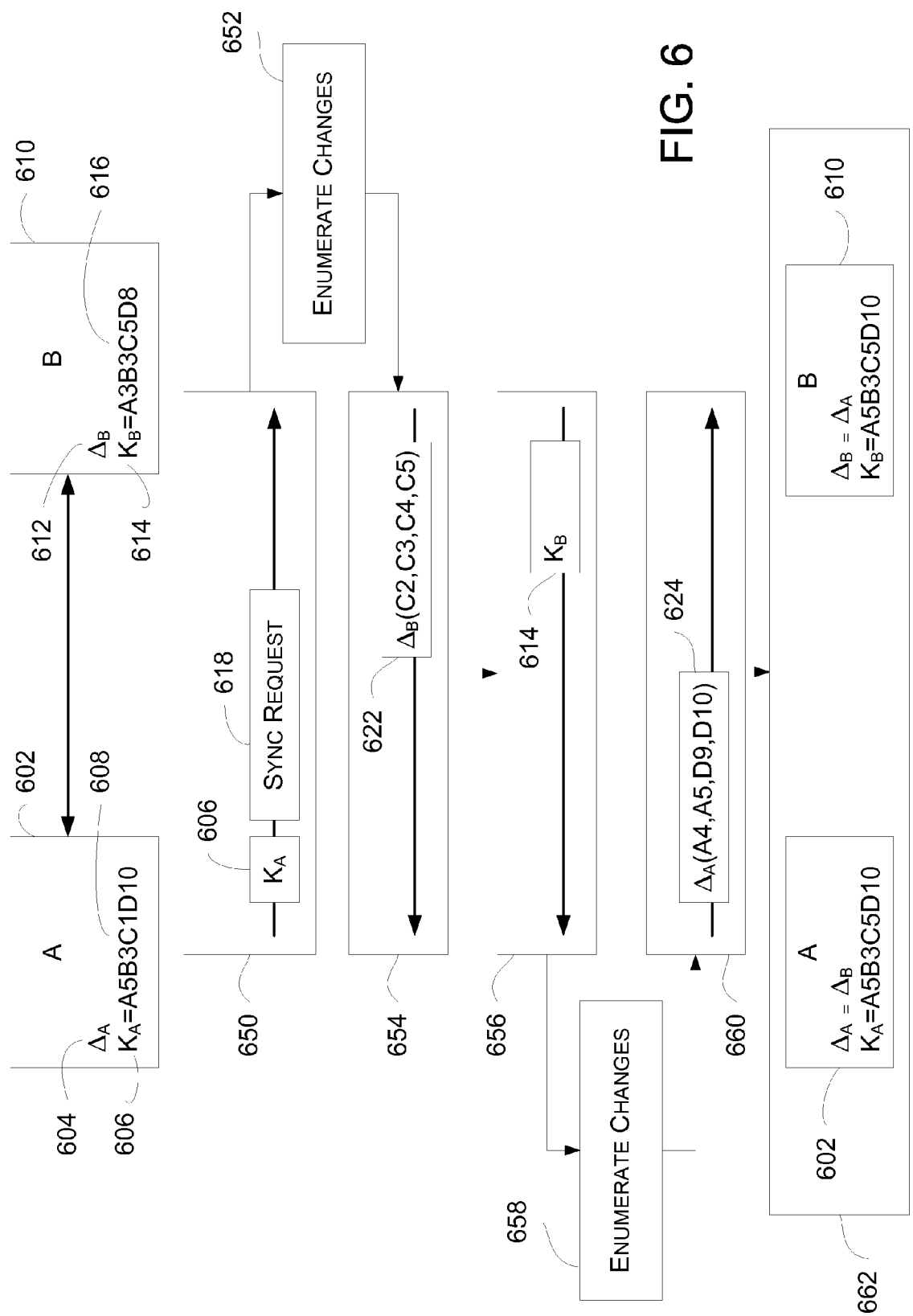
FIG. 6 illustrates an example of replication between two replicas.

Turning now to FIG. 6, shown therein is one example of replication between two replicas. The following description of FIG. 6 is made with reference to FIG. 4. However, it should be understood that the operations described with respect to FIG. 6 are not intended to be limited to being used with the elements illustrated by FIG. 4, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

This example demonstrates a two-way synchronization in which both replica A and replica B transmit changes to the other replica. Again, as stated previously, a two-way synchronization may be implemented as two one-way synchronization operations. Also, the example shown in FIG. 6 does not describe all operations that may exist in a typical one- or two-way synchronization operation. For example, FIG. 6 does not show how replica A or replica B may perform conflict detection after they receive changes from the other replica. Such conflict detection may be performed, for example, using techniques such as those described previously with reference to FIG. 4.

In this example, replica A 602 contains a set of changes 604, knowledge 606, and a knowledge vector 608 that is a shorthand representation of the knowledge 606. Illustratively, the knowledge vector 608 of replica A is A5B3C1D10, which indicates that replica A has knowledge of changes up to a fifth change in replica A 602, knowledge up to a third change in a replica B 610, knowledge up to a first change in a replica C, and knowledge up to a tenth change in a replica D. The replica B of this example includes a set of changes 612, knowledge 614, and a knowledge vector 616 that is a shorthand representation of replica B's knowledge 614. Replica B's knowledge vector 616 is A3B3C5D8, which indicates that replica B has knowledge 614 of changes up to a third change made by replica A 602, knowledge up to a third change made by replica B 610, knowledge up to a fifth change made by replica C, and knowledge up to an eighth change made by replica D. In this example, these knowledge vectors include a continuous representation of changes made by a replica from a first change to some subsequent change—for example, the portion of a vector labeled "D10" indicates knowledge of changes from change D1 to change D10. As will be explained in more detail later herein, a knowledge vector may also include a beginning point that is associated with some other change than the first change made by a replica, among other things.

In operation 650 at time 1, replica A 602 sends a sync request 618 along with replica A's knowledge 606 to replica B 610.

In operation 652, replica B 610 enumerates changes to send to replica A by comparing replica A's knowledge 606 to change IDs associated with the changes in replica B. During this comparison, replica B discovers that it has changes made by replica C of which replica A is not aware. These changes are associated with the change IDs C2, C3, C4 and C5. In one embodiment, replica B may perform this operation by examining each of its items and noting those items that have change IDs that are not members of the knowledge sent by replica A. In another embodiment, replica B may examine its changes directly and identify those changes that are not members of the knowledge sent by replica A.

Then, in operation 654 at time 2, replica B sends those of its changes 622 that correspond to these change IDs, as long as the changes labeled with those change IDs are the current changes applicable to items in replica B 610. That is, if a change ID corresponds to a previous and now outdated change, no change corresponding to that ID may be sent. For example, although not shown in this figure, if an item that earlier had a version C3 was updated again and assigned a new version—perhaps with change ID C4, the change associated with C3 may no longer exist in replica B 610, and regardless of the state of its existence, may not be sent to replica A. Instead, only the change associated with the most recent ID, change ID C4 in the discussion of this paragraph, may be sent.

In operation 656, at a subsequent time 3, or simultaneous with operation 654 at time 2, replica B 610 sends to replica A 602 the current state of replica B's knowledge 614. In this example, the knowledge consists of the knowledge vector A3B3C5D8.

At this point, a one-way synchronization initiated by replica A 602, where replica A receives changes from replica B 610, may be considered complete. (As noted above, replica A may also perform other operations, such as incorporating the received changes and conflict detection, that are not shown.) In the example of FIG. 6, a two-way synchronization is accomplished by additionally performing operation 656 and operation 658, described below.

In operation 658, replica A 602 enumerates changes it may have of which replica B 610 is not aware, by comparing the knowledge 614 sent by replica B to the change IDs corresponding to changes in replica A 602. In this example, replica A discovers that replica B does not have the changes represented by the change IDs A4, A5, D9 and D10.

So, in operation 660 at time 4, replica A 602 sends those current changes 624 that exist in replica A's changes 604 that correspond to the change IDs A4, A5, D9, and D10 (except in particular cases, like, for example, where the change ID represents an outdated change, in which case no change may be sent).

In operation 662, replica A 602 and replica B 610 update their knowledge vectors 608 and 616 respectively, as each replica now has knowledge of the recently replicated changes. As shown in operation 662 at time 5, replica A's updated knowledge vector, A5B3C5D10, is equal to replica B's knowledge vector. Both knowledge vectors represent knowledge of changes made by replica A up to a fifth change, changes made by replica B up to a third change, changes made by replica C up to a fifth change, and changes made by replica D up to a tenth change. Both replicas may also perform other operations before, during, or after, operation 662, including incorporating received changes and performing conflict detection.

Turning now to FIG. 7A and FIG. 7B, shown therein are two methods of updating knowledge vectors following a complete replication such as that represented in FIG. 6.

Specifically, FIG. 7A illustrates a method for updating a knowledge vector using an exception list 702 stored on a replica. This example uses the initial knowledge vector of replica A, knowledge vector 608, which is equal to A5B3C1D10. To create an exception list 702, the replica notes the change IDs associated with the changes received during a synchronization operation. When a change is added to a replica, the corresponding change ID is added as an exception to an exception list 702. At some later point in time, the knowledge for replica A is examined. In FIG. 7A, again corresponding to changes received by replica A in FIG. 6, the knowledge includes a knowledge vector 608 and an exception list 702 that includes the exceptions C2, C3, C4 and C5. An examination of the exception list 702 in conjunction with the knowledge vector 608 reveals that including the change IDs from the exception list 702, the knowledge of replica A includes all changes up to a fifth change made by replica C. Thus, the exceptions can be removed from the knowledge of replica A and replica A's knowledge vector updated to include an element C5 as shown in the updated knowledge vector 704.

A similar analysis can be performed on the knowledge 614 of replica B 610. The original knowledge vector 616 combined with the exceptions A4, A5, D9 and D10 in the exception list 703 enables the knowledge vector 616 to be updated to an updated knowledge vector 706.

Notably, if only a partial replication was performed, such as for example if the changes corresponding to the change IDs A4 and D9 were not sent in a replication, then the knowledge 614 of replica B 610 would need to maintain the exceptions A5 and D10 until they could be removed for example, by a subsequent replication with another replica that transfers the changes represented by the change IDs A4 and D9 to replica B.

FIG. 7B illustrates another method of updating the knowledge vectors 608 and 616 to reflect the replication shown in FIG. 6. In this example, the knowledge vectors are updated using an element-wise, or pointwise, maximum for each of the elements in the original knowledge vectors 608 and 616, to form an updated knowledge vector 708. The first element of each of the knowledge vectors 608 and 616 corresponds to a set of change IDs associated with changes made in replica A. Because A5 is the element-wise maximum element of the two knowledge vectors 608 and 616, the updated knowledge vector 708 includes an element A5. Likewise, the vector elements B3, C5 and D10 each represent an element-wise maximum element corresponding to the changes on the particular replicas to which each of the elements correspond.

As can be seen if each of the updated knowledge vectors 704, 706, and 708 are examined, the same updated knowledge vector is obtained by either method. The element-wise maximum method of knowledge vector updating may typically be used when a complete replication has been performed. The exception list method of updating the knowledge vector may be useful when it is not certain that a complete replication has occurred (as might happen when, for example, a user cancels the replication, a device crashes, and so on). That is, the exception list method may need to be used so that exceptions can continue to comprise a portion of the knowledge of a particular replica when the full knowledge of the replica cannot be represented in simple vector form.

Turning now to FIG. 7C, an example of updating knowledge is shown for a replica that has information from an incomplete replication. FIG. 7C includes an original knowledge vector 710, an original exception list 712, an updated knowledge vector 714, and an updated exception list 716. With regard to the replica shown, after the partial replication, the replica has all of the change IDs labeled A1 through A5, represented by the vector element A5, and all of the change IDs labeled A7 through A10, represented by the list of exceptions including A7, A8, A9 and A10. As shown in FIG. 7C, in an updated version of the knowledge, the updated exception list 716 can be shortened to indicate inclusion of all elements from A7 to A10 such as by the expression (A7:A10) shown in FIG. 7C. This expression is simply a vector such as those that have been previously discussed herein except that the beginning point of the vector is some other point than the first change for replica A. Thus the representation of the replica's knowledge as it relates to A is represented by the vector element A5 and the exception vector (A7:A10).

In the case of the knowledge of the replica regarding replica B, the knowledge vector 710 can be updated to include the continuous change IDs subsequent to the change IDs included in the vector element for replica B. The vector element B1 includes only the change ID B1. Because change IDs B2, B3, and B4 exist in the exception list 712, and they are continuous with the change ID B1 included in the knowledge vector 710, the vector element for replica B can be updated to B4 in the updated knowledge vector 714, representing the inclusion of elements B1 through B4. Because the change ID B5 is missing from the exception list, the exception B6 must remain in the updated knowledge exception list 716—it cannot be subsumed by the replica B element in the updated knowledge vector 714.

A similar analysis can be performed regarding knowledge about changes made by replica C. The original knowledge vector 710 includes C5. The original exception list includes C6, C7 and C8. Because the original knowledge vector element C5 includes change IDs C1 through C5, and C5 is continuous with the change IDs in the original exception list 712, the updated knowledge vector element for replica C can be updated to C8.

Filtered Replication

In some embodiments, a filter may also be specified or provided during a synchronization request. A filter is any construct that serves to identify a particular set of items in a data store. During replication, the enumerated changes may be filtered using the filter so that only changes that are identified by the filter are returned to the requestor. For example, a simple filter might specify "all items that are green. " The changes returned to the requesting replica might then only include changes to items that are green. Changes to items that are not green might not be sent to the requestor.

Figure 8:
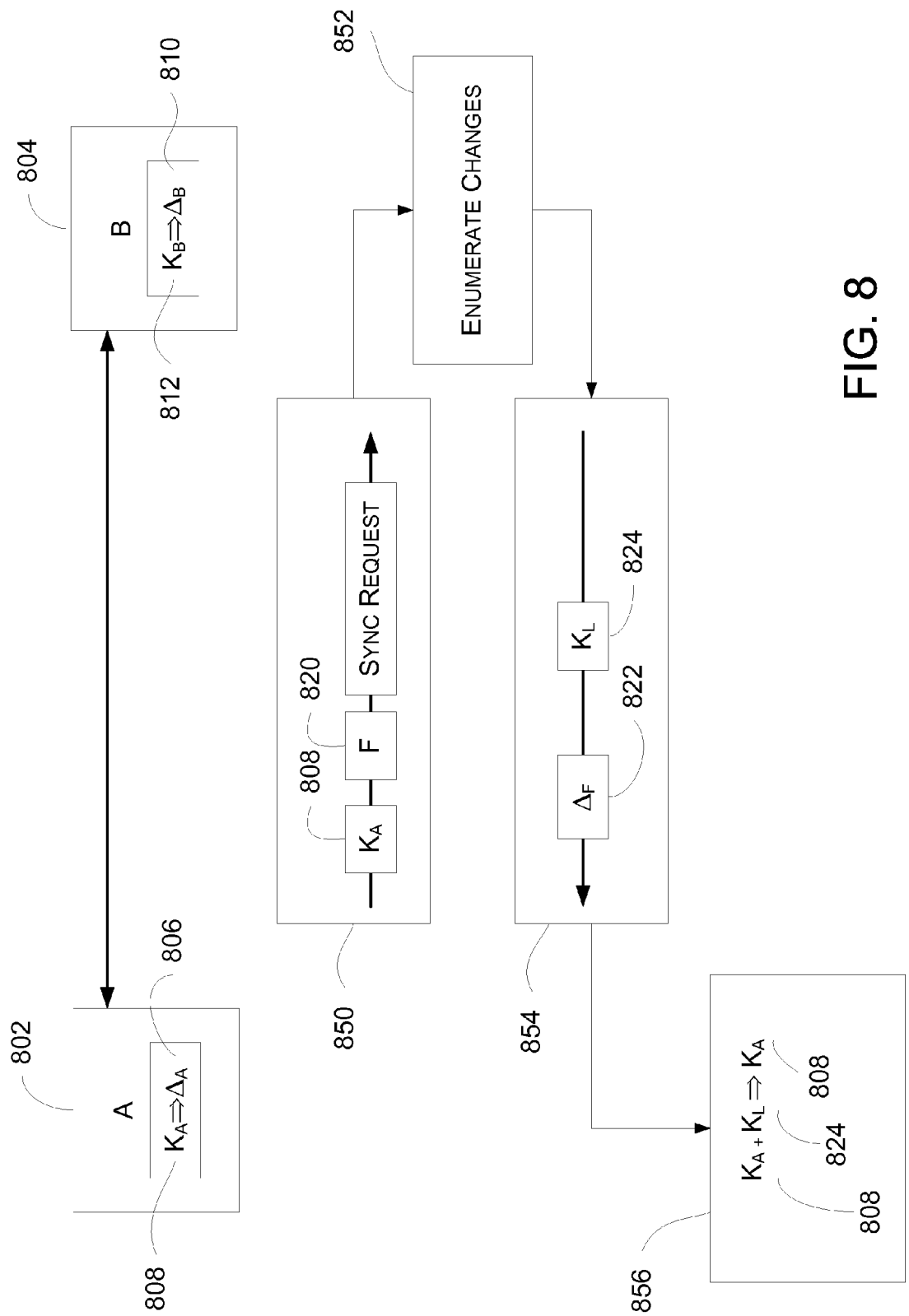
FIG. 8 illustrates an example of replication between two replicas using a filter.

Turning now to FIG. 8, shown therein is an example of replication between two replicas using a filter. The following description of FIG. 8 is made with reference to FIG. 3 and FIG. 4. However, it should be understood that the operations described with respect to FIG. 8 are not intended to be limited to being used with the elements illustrated by FIG. 3 and FIG. 4, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

The example shown in FIG. 8 is a one-way synchronization initiated by replica A. In this example, replica B identifies changes not in replica A and transmits such changes to replica A, where the transmitted changes may be incorporated into the changes already in replica A. In contrast to previous examples, such as the example described with reference to FIG. 3, this example demonstrates the use of a filter to possibly modify the items identified and returned by replica B.

FIG. 8 shows two replicas: replica A 802 and replica B 804. Replica A includes knowledge 808, in this example labeled $K_A$. Replica A further includes a set of changes 806, in this example labeled $\Delta_A$. Similarly, replica B 804 includes a knowledge 812 labeled $K_B$ and a set of changes 810 labeled $\Delta_B$.

To begin the replication, in operation 850, replica A 802 sends a sync request, which is received by replica B. As previous examples have shown, the sync request includes replica A's knowledge 808. In contrast to previous examples, however, the sync request also includes a filter 820. The filter 820 is any construct that provides a mechanism by which a replica can identify zero or more particular items or changes. For example, in some embodiments, a filter might consist of criteria that can be evaluated against items—for example, "every item that is green. " In other embodiments, a filter might be an explicit list of items. In some embodiments, the filter itself may be transmitted as part of the sync request. In other embodiments, the filter may be stored elsewhere and only some means of identifying the filter may be transmitted as part of the sync request. In yet other embodiments, certain types of sync requests may automatically result in the use of certain filters, in which case the filter itself may not be transmitted with the sync request. For example, a sync request transmitted over a low bandwidth connection might automatically result in the use of a filter that in some way reduces the number or nature of the items or changes returned.

In one implementation of operation 852, replica B 804 identifies the changes to be sent to replica A. Such changes are those that are a) not known by replica A, as identified by the transmitted knowledge $K_A$, and b) are identified by the filter. Changes that are not identified by the filter are not chosen to be returned to replica A, even if they are not known by replica A. This operation may be accomplished in a variety of fashions. In one embodiment, for example, replica B may examine each of its items and identify those items that are in the filter, and then compare the versions associated with each item in the filter with the transmitted knowledge, and choose those items whose versions are not in the transmitted knowledge. In another exemplary embodiment, replica A may examine its changes and identify those that are not in the knowledge transmitted by replica A, and then filter the resulting changes using the filter 820.

As will be appreciated after further discussion in this description, the period of time at which the filter is evaluated may affect the items that are considered to be "in the filter" or "out of the filter. " For example, in some implementations it may be possible that replica A considers a particular item to be in the filter while replica B considers the same item to be out of the filter. Various techniques for handling this issue are discussed at various points in the remainder of this description.

In operation 854, replica B 804 sends the changes identified during operation 852, and replica A receives the changes. In FIG. 8, these changes are illustrated as $\Delta_F$ 822. Replica B also sends a knowledge value, sometimes called a learned knowledge value, associated with replica B and labeled as $K_L$ 824. This knowledge value may be used by replica A 802 to update its knowledge 808.

In operation 856, replica A 802 updates its knowledge 808 by incorporating the knowledge value $K_L$ 824 returned by replica B 804. The manner in which a receiving replica, such as replica A, updates its knowledge may be different in a replication with filters. In some previously discussed embodiments, where the entire data store was considered for changes and no filter was used, the updated replica A knowledge value 808 could be formed by, for example, combining $K_A$ and $K_L$. For example and without limitation, suppose replica A's knowledge value before replication was $K_A$=A2B5 and that the knowledge value returned by replica B was $K_L$=A1B7. In some previous examples, without a filter, the updated knowledge value $K_A$ 808 could be determined by combining $K_A$ and $K_L$, perhaps using mechanisms described with respect to FIG. 7A or FIG. 7B. In such a case, the resulting knowledge value $K_A$ 808 determined in operation 856 may have been $K_A$=A2B7 (the maximum of A2B5 and A1B7).

In contrast, with filtered replication the updated knowledge value may not in some cases be determined by, for example, taking the maximum of the existing knowledge value and the transmitted learned knowledge. This is the case because replica B has not necessarily transmitted all of its changes—it's only transmitted particular changes: those changes that are identified by the specified filter. If the initiating replica were to update its knowledge value without regard to the use of the filter, it could happen that the updated knowledge value might indicate that the replica has knowledge of changes that were not actually transmitted (perhaps because they were not identified by the filter).

To resolve this problem, the knowledge value 808 is updated in operation 856 using a "base knowledge" and an additional knowledge value associated with the use of the filter. Using the example introduced in the previous paragraphs, with original knowledge $K_A$=A2B5 and the returned knowledge value $K_L$=A1B7, the updated knowledge value 808 for replica A might be represented in one of many ways, including as $K_A$=A2B5+F:A1B7, where A2B5 is the base knowledge and F:A1B7 is the additional filtered knowledge value. Such a knowledge value indicates that replica A has general knowledge of changes through A2B5 (i.e., knowledge of changes to all items through a second version on replica A and through a fifth version on replica B). The additional filtered knowledge value also indicates that replica A knows of changes through A1B7 for items or changes that are identified by the filter F.

Knowledge is considered, cumulative, or additive, so that, if an item or change is identified to be in filter F, replica A can be considered to have knowledge through A1B7 as well as through A2B5. For example, suppose that a particular change to a particular item is associated with the change ID B6. If the changed item is in the filter F, then replica A can be considered to have knowledge of the change, because the change ID B6 is in the knowledge A2B5+F:A1B7—in this case, change ID B6 is in the filtered knowledge portion of the overall knowledge value. In contrast, if the item associated with change ID B6 was not in the filter F, then replica A would not have knowledge of the change—in this case, the change ID B6 would only be compared against the base knowledge value of A2B5, and would be found to not be a member of A2B5. The fact that replica A has a filtered knowledge value F:A1B7 does not help if the change or item is not in the filter.

Replica A may only update its knowledge using the learned knowledge value $K_L$ 824 if it actually incorporates the changes $\Delta_F$ 822 that were transmitted by replica B. If the replica does not incorporate the transmitted changes, it may not update its knowledge.

Through this mechanism, an efficient filtered replication may be performed where changes in the filter that are not known by the initiating replica are identified and transmitted to the initiating replica.

As with non-filtered replication, like that described previously with respect to, for example, FIG. 3, the initiating replica may detect conflicts between changes already on the initiating replica and those transmitted by the other replica. It may do so using the change IDs associated with changes on both replicas and made-with-knowledge values. The conflict detection techniques discussed previously, for example like those discussed in detail with reference to FIG. 4, also apply to replication with filters.

Figure 9:
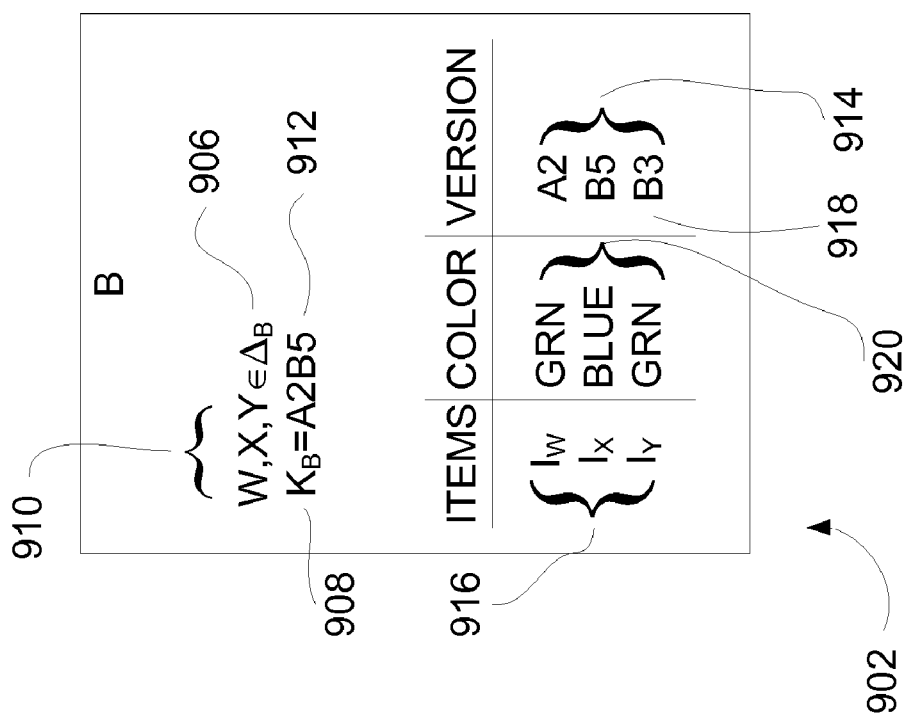
FIG. 9 illustrates an exemplary embodiment of data that might be used in a filtered replication example.

Turning now to FIG. 9, shown therein is one exemplary embodiment of data that might be used in a filtered replication example. FIG. 9 shows selected elements of a replica B 902. These elements include a collection of changes 906 and knowledge 908. The collection of changes 906 includes several individual changes 910, in this example illustrated as W, X, and Y. In this example, the present state of knowledge—that is, the knowledge 908 of replica 902—is denoted by knowledge vector 912 that is in this case equal to A2B5.

Also represented in FIG. 9 are a number of change IDs 914 and colors 920 associated with individual items 916. In this example, replica B 902 includes three changed items 916: $I_W$, $I_X$, and $I_Y$. These items have corresponding color values 920. For example, item $I_W$ is green while item $I_X$ is blue. The items also have corresponding changes 910, labeled W, X, and Y. Using the change IDs, one can discern that the item $I_W$, with change ID A2, was changed in replica A at a time denoted by version number 2. Item $I_X$, with change ID B5, was changed in replica B at a time denoted by version number 5. (As a side note, the relationship between the time when $I_W$ was changed, with change ID A2, and the time when $I_X$ was changed, with change ID B5, is, by itself, unknown, because the changes were made on different replicas. That is, one cannot tell by examining the information in FIG. 9, whether the change associated with change ID A2 was made before or after the change associated with change ID B5. However, item $I_Y$, with change ID B3, can be determined to have changed before item $I_X$, which again has change ID B5, because both of these changes were made on replica B, and the number 3 is less than the number 5.)

Figure 10:
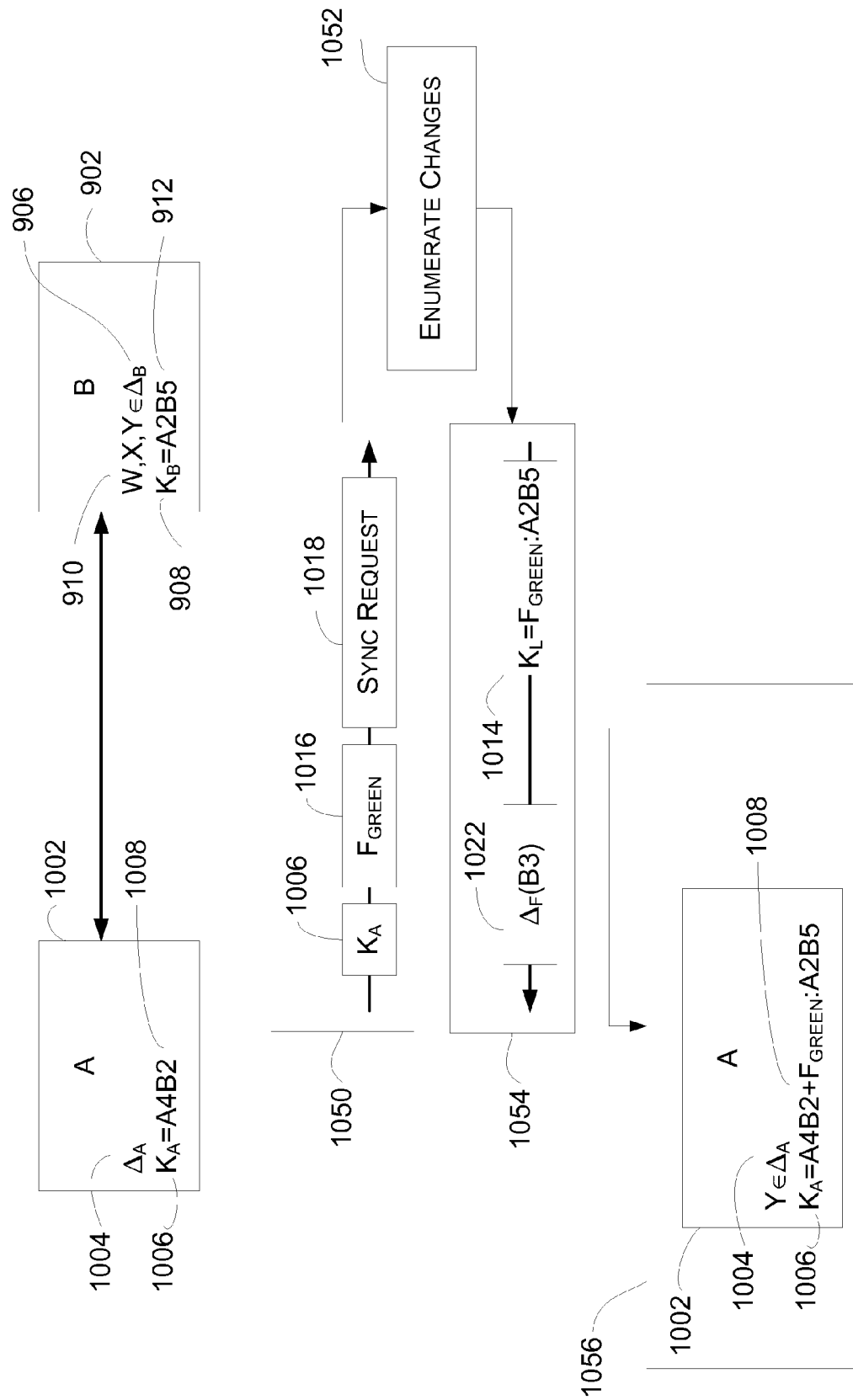
FIG. 10 illustrates another example of filtered replication between two replicas.

Turning now to FIG. 10, shown therein is one example of filtered replication between two replicas. The following description of FIG. 10 is made with reference to FIG. 6 and FIG. 9. However, it should be understood that the operations described with respect to FIG. 10 are not intended to be limited to being used with the elements illustrated by FIG. 6 and FIG. 9, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

This example illustrates a one-way synchronization initiated by replica A 1002. The replica with which replica A is replicating in this example is replica B 902, which was introduced and explained previously with reference to FIG. 9. It should be noted that the example shown in FIG. 10 does not describe all operations that may exist in a typical synchronization operation. For example, FIG. 10 does not show how replica A may perform conflict detection after it receives changes from replica B.

In this example, replica A 1002 contains a set of changes 1004 labeled $\Delta_A$, knowledge 1006 labeled $K_A$, and a knowledge vector 1008 that is a shorthand representation of the knowledge 1006. Illustratively, the knowledge vector 1008 of replica A is A4B2, which indicates that replica A has knowledge of changes in replica A up to a fourth change and knowledge of changes in replica B up to a second change. As was stated in the discussion of FIG. 9 previously, replica B 902 has a set of changes 906 labeled $\Delta_B$, that include individual changes W, X, and Y 910. Replica B also has knowledge 908 labeled $K_B$, and a corresponding knowledge vector 912 that in this case is A2B5, indicating the replica B has knowledge of changes on replica A up to a second change and knowledge of changes on replica B up to a fifth change.

In operation 1050, replica A 1002 sends a sync request 1018 to replica B. Replica A also includes both its knowledge 1006 and a filter $F_{GREEN}$ 1016. The filter 1016 in this example specifies that replica wants all changes to items that are green.

In operation 1052, replica B 902 determines the changes it should send in response to the sync request 1018. In this example, the changes to be sent should be in the filter—that is, only changes to items that are green should be sent. In addition, as was the case with previous examples, like that shown in FIG. 6, only changes not known to replica A 1002 should be sent. In this example, this means that only changes not represented by the transmitted knowledge 1006, which equals knowledge vector A4B2, should be sent. Examining the changes and items in replica B, as illustrated in FIG. 9, it is evident that only change Y, associated with item $I_Y$ and change ID B3, should be sent. Item $I_Y$ is green, so it falls into the filter. In addition, the change ID associated with item $I_Y$ is B3, which is not in the transmitted knowledge A4B2, indicating that replica A does not already know of this change. In contrast, neither change W to item $I_W$ or change X to item $I_X$ should be transmitted. Item $I_W$ is green, and so falls into the filter, but its change ID is A2 and so replica A already knows of the change. Item $I_X$ is blue, not green, and so it is not in the filter 1016 and should not be transmitted, regardless of whether replica A knows of the change (which it does not in this case—if there was no filter, then the change to item $I_X$ would have been transmitted, because the change has change ID B5, which is not in replica A's transmitted knowledge).

In operation 1054, replica B 902 sends the single identified change associated with item $I_Y$ with change ID B3, labeled as $\Delta_F$ 1022. Replica B also sends the learned knowledge $K_L$ 1014 which, in this example, is labeled $K_L = F_{GREEN}:A2B5$. This learned knowledge indicates that, after incorporating the sent changes, the initiating replica may update its knowledge such that it has knowledge of changes through A2B5, but only for items in filter $F_{GREEN}$. In an alternative embodiment, replica B may not qualify the learned knowledge with a filter—that is, in this example it might just send $K_L = A2B5$. Regardless of how replica B qualifies the learned knowledge it sends, replica A knows that the knowledge can only be applied to items in the filter and so when it updates its knowledge, as will be discussed below with reference to operation 1056, it can only update its knowledge for those items in the filter.

In operation 1056, replica A 1002 incorporates the sent change Y associated with item $I_Y$ and change ID B3 into its changes $\Delta_A$ 1004. Replica A also updates its knowledge $K_A$ 1006 so that it contains A4B2+$F_{GREEN}$:A2B5. This knowledge indicates that replica A has knowledge of changes, for all items, through a fourth change on replica A (A4) and through a second change on replica B (B2). It also indicates that, for items in the filter $F_{GREEN}$, replica A has knowledge through a second change on replica A (A2) and through a fifth change on replica B (B5). As was discussed previously, this knowledge is additive—that is, an item in filter $F_{GREEN}$ is in the knowledge if at least one of the following is true: it is in the filtered knowledge fragment A2B5, or it is in the base knowledge A4B2. If a change ID is in either of these pieces of knowledge, and the associated item is in the filter, then the change is known to the replica. This concept and technique may be extended to arbitrary numbers of knowledge fragments. For example, it is conceivable that the knowledge of some, heretofore not discussed, replica might be something like A10B5C2+$F_1$:A5C2+$F_2$:A20B20C20+ . . . +$F_x$:B5C 10D15, where X is some arbitrary number or other identifier.

The filter $F_{GREEN}$ discussed previously is an example of a type of filter called a "property-based filter." In this context, a property-based filter is defined as a filter whose membership is defined solely by the contents of one or more properties associated with the items in or not in the filter. So, for example, as filter $F_{GREEN}$ includes those items that are green, filter $F_{GREEN}$ is a property-based filter. As was discussed previously, a filter is any construct that can divide or limit a set of data.

In contrast, one example of a filter that is not property-based is a filter that is based on a date or time that changes outside the context of individual items. For example, one filter might specify "all emails received in the last two weeks." This filter is not property-based because the membership of the filter changes with the date, independent of any property on an email. That is, an email received 14 days ago might be in the filter today, and then not in the filter tomorrow, even though the email and the properties associated with the email have not changed.

A characteristic of property-based filters that is sometimes desirable is that any change to an item that results in an item entering or leaving a filter's membership also has an associated change ID. That is, an item cannot enter or leave a filter without generating an associated change. This may be useful when, among other things, resolving issues that may occur because of differences in filter membership due to the time at which filter membership is evaluated.

Figure 11:
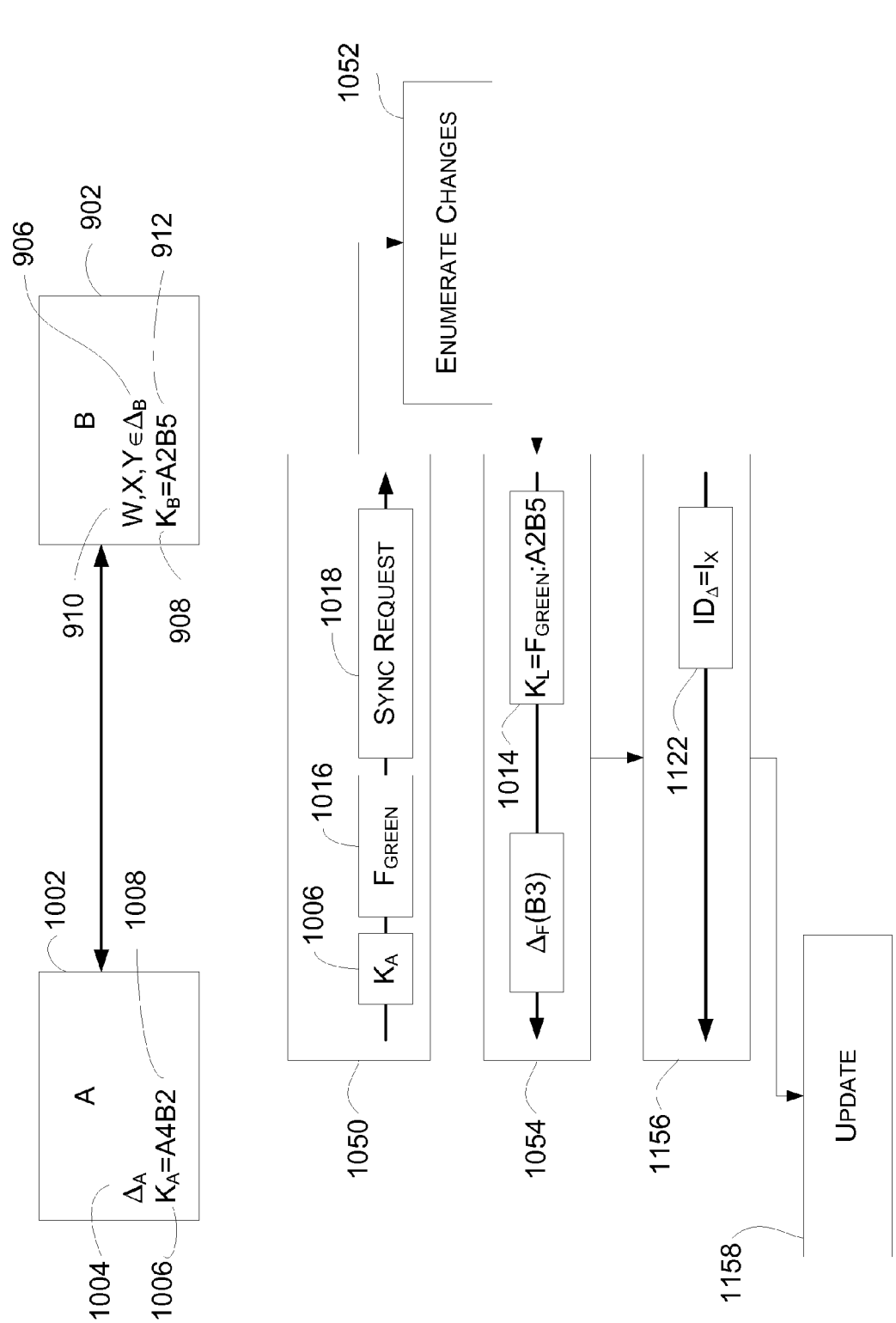
FIG. 11 illustrates exemplary techniques directed toward an issue that arises because of differences in filter membership due to the time at which a filter is evaluated.

Turning now to FIG. 11, shown therein are exemplary techniques directed toward an issue that arises because of differences in filter membership due to the time at which a filter is evaluated. That is, it may be possible for two replicas to believe different items are in a filter, and out of the filter, when the two replicas evaluate the filter—for example, "which items are green?"—at different times. FIG. 11 contains the same operational flow and elements as FIG. 10, and the discussion previously with respect to FIG. 10 also applies. In addition, FIG. 11 also includes a new operation 1156 and a new operation 1158 directed toward this issue. The following description of FIG. 11 is made with reference to FIG. 9 and FIG. 10. However, it should be understood that the operations described with respect to FIG. 11 are not intended to be limited to being used with the elements illustrated by FIG. 9 and FIG. 10, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

Continuing with the example discussed previously with respect to FIG. 10, and the data provided in FIG. 9, recall that the change X associated with item $I_X$ and change ID B5 was not returned from replica B 902 to replica A 1002. This occurred because at the time replica B evaluated the filter $F_{GREEN}$, item $I_X$ was blue. Since the item was not green and so not in the filter, replica B did not return it to replica A. In the context of the discussion of FIG. 10, this may enable replica A to be updated appropriately.

However, suppose that the change associated with B5 was actually in the color of item $I_X$. For example, perhaps at a time immediately before the time of change B5, item $I_X$ was green. Then item $I_X$ changed from green to blue, and this change was accorded change ID B5. Because replica A 1002 does not have knowledge of the change from green to blue, replica A may believe that item $I_X$ is in the filter. Because replica A believes that item $I_X$ is in the filter, it is interested in any changes to item $I_X$, and should therefore receive the change X associated with change B5. Given only the discussion in FIG. 10, this won't occur—again, when replica B 902 evaluates changes to return in operation 1052, it will see that item $I_X$ is not in the filter and not send any changes associated with item. Without a technique directed toward this issue, the knowledge replica A maintains at the end of the replication may not encompass all of the changes it should. In this example, as was discussed with reference to FIG. 10, replica A's knowledge will be A4B2+$F_{GREEN}$:A2B5. This indicates that replica A knows about all changes to items in the filter through A2B5, which may not be considered true in this particular further example, because replica A does not know about change B5, as it was never sent from replica B. Because replica does not know about change B5, it may still believe that item $I_X$ is green, when in reality it should know that item $I_X$ is now blue.

The techniques described here with reference to FIG. 11 are directed toward addressing this issue with property-based filters. In addition, further techniques described in other parts of this specification—for example, with reference to FIG. 12—may also be applicable to this general problem.

Returning to FIG. 11, replica B 902 first sends the identified change—again, this is change Y associated with item $I_Y$ and change ID B3—and the learned knowledge in operation 1054.

Then, in one example of new operation 1156, replica B also sends identifying information about items that have changed since replica A 1002 last replicated and that replica B considers to not be in the filter. These changes might be referred to as "non-filtered changes." This information then enables replica A to update its knowledge so that it avoids asserting that it knows something about changes that it has not received.

Replica B may determine which items have changed since the last time replica A replicated using the knowledge transmitted by replica A, which is knowledge $K_A$ 1006 in this example. Any changes known by replica B that are not represented by the transmitted knowledge $K_A$ may be considered to have been made after the last replication. Note that the term "last replication" does not mean the last time a replica synchronized with this particular other replica—that is, in this example it does not mean "the last time replica A received changes from replica B." Instead, it refers to replica A's knowledge about changes obtained through any previous replications with any other replicas, as was described previously for example with reference to FIG. 1 where replicas are able to make changes individually and synchronize with a variety of other replicas, without maintaining a specific understanding of which replicas have been part of past replications.

The identifying information that replica B sends may be any information that enables replica A to identify particular items. As a specific example, in some implementations the identifying information may be a unique identifier associated with each item.

In this specific example, along with the sync request 1018, replica A sends the knowledge $K_A$ 1006 with an associated knowledge vector 1008 of A4B2. Using this knowledge vector, replica B can determine that both items $I_X$ and $I_Y$ have changed since replica A last replicated, as both the change IDs B5 (associated with item $I_X$) and B3 (associated with item $I_Y$) are not in the knowledge vector A4B2. It can also determine that item $I_W$ has not changed since the last replication because item $I_W$'s change ID of A2 is in the knowledge vector A4B2. Because item $I_Y$ is in the filter at the time when the filter is evaluated by replica B, the change to item $I_Y$ has already been transmitted as part of operation 1054. However, replica B can see that the change B5 associated with item $I_X$ has not been sent, because, as far as replica B is concerned, item $I_X$ is not in the filter $F_{GREEN}$. Since item $I_X$ has changed since replica A's last replication, replica B sends identifying information for item $I_X$ as part of operation 1156. This is labeled in FIG. 11 as $ID_\Delta = I_X$ 1122.

Once this identifying information has been sent to the initiating replica, like replica A in this example, the initiating replica may use the information in at least one of a few different ways to ensure that it avoids asserting that it knows something about changes that it has not received. This is illustrated in FIG. 11 by update operation 1158.

One possible approach is to simply delete any item that is identified in operation 1156. This technique may be useful, for example, in cases where the initiating replica only maintains data that is in the filter. For example, this might be useful in the case where the initiating replica maintains only email messages in the inbox, rather than all email messages—perhaps because the initiating replica is on a computing device with limited storage space. If the replica only maintains a subset of the stored data and the other replica states that a particular item is not in the filter, then the receiving replica cares no longer about the data associated with the item and can delete the item in question. Using this approach, in the previous example with $F_{GREEN}$, replica A 1002 might delete item $I_X$. The knowledge of the replica when using this approach is updated as was demonstrated with respect to FIG. 10.

Some replicas may want to maintain all data, and so cannot use the approach of deleting identified items discussed in the previous paragraph. In these cases, another alternative is to create an exception in the replica's knowledge for each identified item. For the identified item, the replica may assert only that it knows the previous knowledge—that is, it cannot say that the replication has enabled it to know anything additional about the identified item. In the previous example, replica A would first update its knowledge as before, obtaining the knowledge A4B2+$F_{GREEN}$:A2B5. Then replica A would add an exception for item $I_X$ to indicate that replica A only knows about item $I_X$ what it knew before the replication (as replica B 902 has not sent any changes about item $I_X$). Continuing with the previous example, the resulting knowledge might be denoted as something like A4B2+$F_{GREEN}$:A2B5+$I_X$:A4B2. This knowledge indicates that replica A knows of changes to all items through A4 and B2, of changes to items in the filter $F_{GREEN}$ through A2 and B5, except that it only knows of changes to item $I_X$ through A4 and B2 (which was the knowledge of replica A before the replication began).

During subsequent filtered replications, additional exceptions might be added. Then, when a device does a full replication—without the use of filters—all of the exceptions, as well as the filtered knowledge fragments, can be removed and replaced with a single base knowledge from the full replication.

Figure 12:
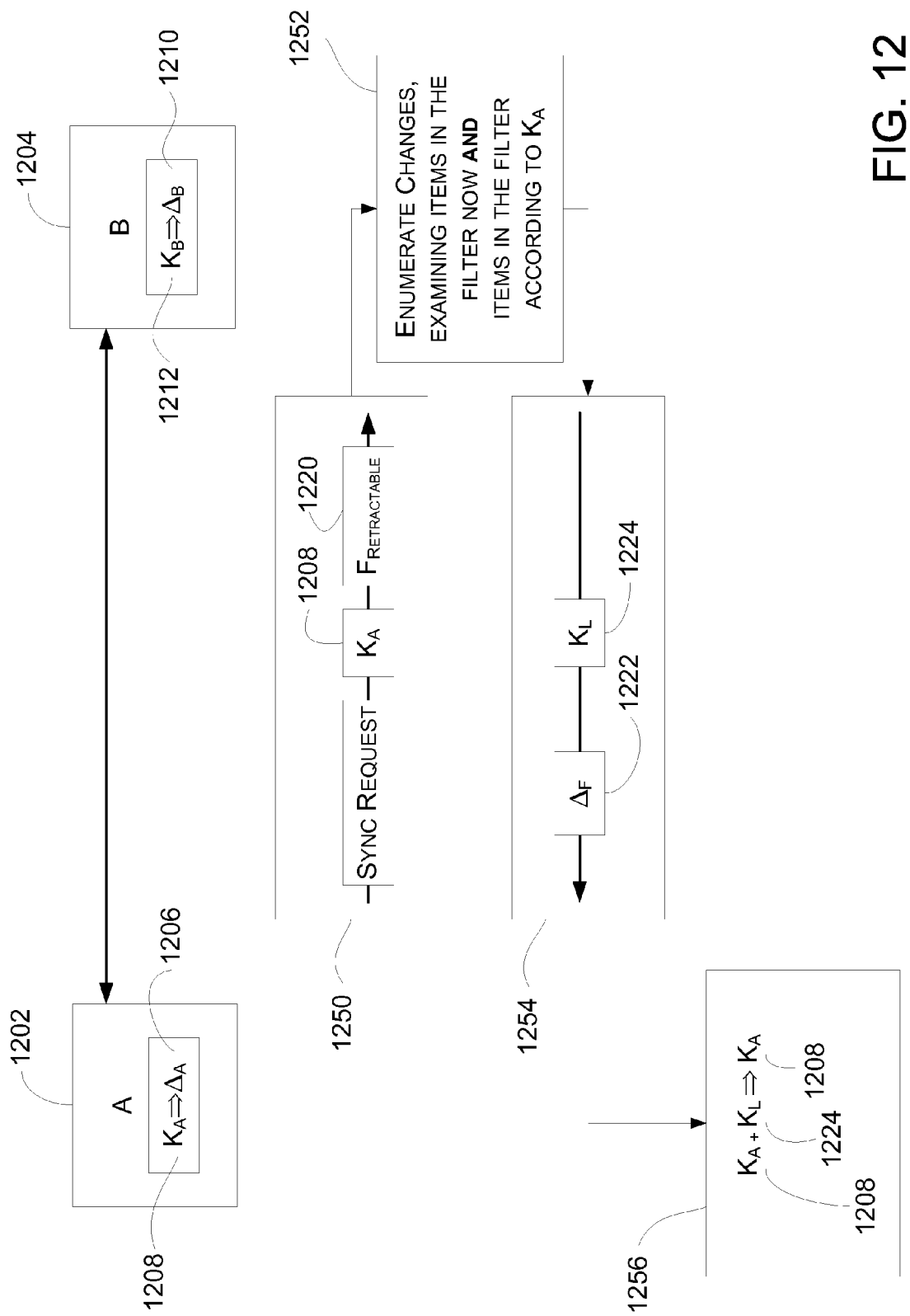
FIG. 12 illustrates an example of a replication between two replicas using a retractable filter.

Turning now to FIG. 12, shown therein is an example of a replication between two replicas using a type of filter called a "retractable filter." The following description of FIG. 12 is made with reference to FIG. 4, FIG. 8, and FIG. 11. However, it should be understood that the operations described with respect to FIG. 12 are not intended to be limited to being used with the elements illustrated by FIG. 4, FIG. 8, and FIG. 11, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

To understand a retractable filter, consider that the discussion of FIG. 11 was directed toward the issue of two different replicas believing that different items were members of a single common filter because the replicas evaluated the filter at different points in time. The discussion with respect to FIG.

11 provided some techniques to resolve this problem by, for example, sending identifiers of particular items along with the identified changes and learned knowledge, and using those identifiers to delete items or create exceptions in the knowledge.

Another approach to the same basic problem is to define and use a filter that enables a replica to determine what the filter's membership was at any point in the past. A filter for which this is the case is called a "retractable filter." Given a retractable filter, a replica can not only evaluate what is in the filter at the present, but can determine what items were in the filter at a point in the past.

The operational flow of FIG. 12 demonstrates how such a retractable filter might be used as another alternative to the operations discussed with reference to, for example, FIG. 11. FIG. 12 shows two replicas: replica A 1202 and replica B 1204. Replica A includes knowledge 1208, in this example labeled $K_A$. Replica A further includes a set of changes 1206, in this example labeled $\Delta_A$. Similarly, replica B 1204 includes a knowledge 1212 labeled $K_B$ and a set of changes 810 labeled $\Delta_B$.

To begin the replication, in operation 1250, replica A 1202 sends a sync request to replica B 1204. Along with the sync request, replica A sends its knowledge 1208. In this example, replica A also includes a retractable filter 1220.

In one implementation of operation 1252, replica B 1204 identifies the changes to be returned to replica A 1202. In contrast to previous filtered replication discussions, for example, with reference to FIG. 8, replica B evaluates changes for items that match the filter at the current time and changes for items known by replica A to match the filter—that is, for items that matched the filter at the time represented by the transmitted knowledge $K_A$ 1208. Replica B can perform this evaluation because the retractable filter provides information about the membership of the filter at any time in the past. Using this additional information, replica B can determine if there are any changes to items in the filter right now, as well as any changes to items that were in the filter according to replica A, even if these items are not in the filter at the present according to replica B. For any of these identified changes, replica B may evaluate whether the changes are members of the transmitted knowledge, as has been previously discussed, and may then determine to send any such changes.

In an implementation of operation 1254, replica B 1204 sends the changes identified during operation 1252 to replica A. In FIG. 12, these changes are illustrated as $\Delta_F$ 1222. Replica B also sends a knowledge value associated with replica B, labeled as $K_L$ 1224, so that replica A can update its knowledge 1208 after examining and possibly incorporating the changes in $\Delta_F$ 1222.

Finally, in an implementation of operation 1256, replica A may incorporate changes and update its knowledge 1208 in a fashion like that discussed previously, for example, with reference to FIG. 8.

In some cases, the use of a retractable filter may necessitate additional processing when incorporating changes and updating knowledge. One case in which this may occur is when the initiating replica, such as replica A, has knowledge of at least some changes of which the receiving replica, like replica B, is not aware. In this case, the knowledge $K_A$ 1208 sent by replica A, and used by replica B during change enumeration, will indicate that replica A knows of at least some changes of which replica B is not aware. Replica B may perform change enumeration like before, for example as described previously with reference to operation 1252, even though it cannot fully evaluate the filter at the time indicated by $K_A$, because it does not have knowledge of all of the changes encompassed by $K_A$. Then, during operation 1256, replica A should ensure that it does not update its knowledge for items that have changes about which replica B does not know. For an item that has a change about which replica B doesn't know, replica A may create an exception that indicates that it knows—for this particular item—what it knew before the filtered replication. It may identify such items by determining if all of the following three criteria are met: a) the item is currently in the filter according to replica A, b) the item is not in the filter according to replica B, by examining the learned knowledge $K_L$, and c) the item is not in the set of changes sent by replica B. If all of these criteria are met, then the initiating replica knows that it has additional knowledge about the particular item.

In addition, if an item changes locally in such a way that it now falls into a filter—that is, an item changes without replication, perhaps due to a change made in an application or through some other means—and the change is made subsequent to a filtered replication like that described with reference to FIG. 12 and using the same filter, the local replica may update its knowledge in a similar fashion to that described in the preceding paragraph. Specifically, the local replica may create an exception for the updated item with a knowledge value that doesn't incorporate the knowledge fragment added as part of the filtered replication.

As with previous discussions of filtered and non-filtered replication, the initiating replica may detect conflicts between changes already on the initiating replica and those transmitted by the other replica. It may do so using the change IDs associated with changes on both replicas and made-with-knowledge values. The conflict detection techniques discussed previously, for example those discussed in detail with reference to FIG. 4, also apply to replication with retractable filters.

Turning now to FIG. 13, shown therein is a set of example list membership data that might be used in a filtered replication scenario that uses a "list-based filter." To understand list-based filters, first consider that many filters are not retractable. For example, the $F_{GREEN}$ filter that includes all items that are green and was discussed previously with reference to, for example, FIG. 10, is not retractable. Given information only about the current state of a set of data and a simple statement that "all items that are green" fall into a particular filter is only sufficient to determine what is in the filter according to the state of the data at the time the filter is evaluated. Using this information, one cannot determine the membership in the filter at a previous time, and so the filter $F_{GREEN}$ is not retractable.

One mechanism for defining a retractable filter is to track when an item enters or leaves the membership of a filter, by maintaining a list of items and associated lists of entry and exit information. A filter that uses such a list may be referred to as a "list-based filter." Because a list-based filter tracks when items enter and leave the filter's membership, another name for a filter of this type might be "membership-tracking filter."

The list membership data 1300 illustrated in the table of FIG. 13 illustrates the membership data of an example list-based filter, labeled $F_1$, on an example replica B 1402, which is discussed in more detail below with reference to FIG. 14. The list membership data 1300 consists of a list of items 1302 and a list of entry and exit information 1304. The particular example of membership data illustrated with respect to FIG. 13 shows that item $I_W$ entered the filter at change ID A2; item $I_X$ entered the filter at change ID A3 and exited the filter at change ID B7; item $I_Y$ entered the filter at change ID B2, exited at change ID B4, and then re-entered the filter at change ID B10; and item $I_Z$ entered the filter at change ID A11. At the time represented by the list membership data, items $I_W$, $I_Y$, and $I_Z$ are in the filter; Item $I_X$ is not in the filter. Another item, perhaps named item $I_V$, is not in the list and so can be considered to not be in the filter currently and to not have been in the filter at any point in the past.

Using the list membership data 1300, a replica can determine if an item was in the filter at a particular time in the past, where the time in the past is represented by a knowledge vector. For example, using an example knowledge vector of A12B5, items $I_W$, $I_X$, and $I_Z$ can be considered to be in the filter and item $I_Y$ can be considered to not be in the filter. Item $I_W$ entered the filter with change ID A2, which is part of the knowledge vector A12B5, and has not left the filter, so it is in the filter at the time represented by A12B5. Similarly, item $I_Z$ is also in the filter because it entered the filter at time A11, which again is in the knowledge vector A12B5, and has not left the filter. Item $I_X$ entered the filter as of change ID A3, which is in the knowledge vector A12B5, and exited the filter as of change ID B7. Because the exit change ID B7 is not in the knowledge vector A12B5, item $I_X$ is considered to be in the filter at the time represented by A12B5, even though the list membership data 1300 shows that it later leaves the filter. Finally, item $I_Y$ is considered to not be in the filter at the time represented by the knowledge vector A12B5, because A12B5 contains the entry and exit change IDs of B2 and B4, respectively, but does not contain the more recent entry change ID of B10. That is, in this case the most recent change ID in the data for item $I_Y$ that is also in the knowledge vector A12B5 is an exit change ID, so the item is not in the filter as of the time represented by A12B5.

The list membership data illustrated in the example of FIG. 13 represents only one of many ways in which list membership data may be maintained for a list-based filter and is not intended to be limiting. Any filter that maintains a list of items and associated entry and exit times may be considered a "list-based filter."

Turning now to FIG. 14, shown therein is one exemplary embodiment of item version information. FIG. 14 shows selected elements of a replica B 1402. These elements include a collection of changes 1406 and knowledge 1408. The collection of changes 1406 includes several individual changes 1410, in this example illustrated as V, W, X, Y, and Z. In this example, the present state of the knowledge of the replica is denoted by a knowledge vector 1412 that is in this case A11B20. The knowledge vector 1412 represents replica B's knowledge 1408. Note that FIG. 14 shows only selected elements of replica B 1402 and does not show all elements that might exist in a replica.

Also illustrated in FIG. 14 are a number of change IDs 1414 associated with individual items 1416. In this example, replica B 1402 includes five changed items 1416: $I_V$, $I_W$, $I_X$, $I_Y$, and $I_Z$. These items have corresponding changes 1410 labeled V, W, X, Y, and Z. Using the change IDs 1414, one can discern that, for example, the item $I_V$, with change ID B14, was changed in replica B at time 14. One can also determine that the other items were changed in the noted replica at the noted times, as has been explained previously for example with reference to FIG. 5 and FIG. 9.

Figure 15:
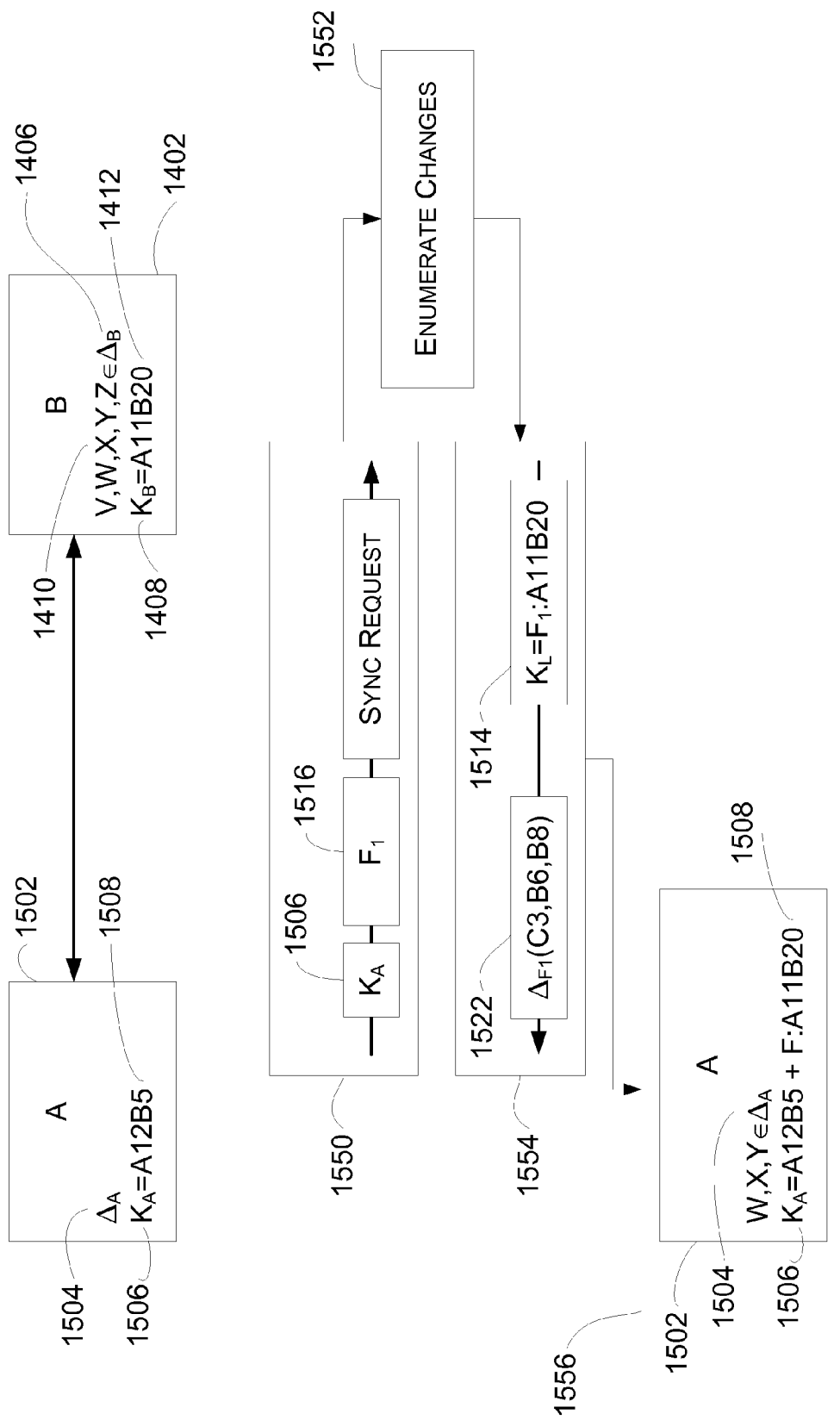
FIG. 15 illustrates an example of filtered replication using a list-based filter.

Turning now to FIG. 15, shown therein is an example of filtered replication using a list-based filter. The following description of FIG. 15 is made with reference to FIG. 4, FIG. 10, FIG. 13, and FIG. 14. However, it should be understood that the operations described with respect to FIG. 15 are not intended to be limited to being used with the elements illustrated by FIG. 4, FIG. 10, FIG. 13, and FIG. 14, or any other figures. In addition, it should be understood that, while the illustration of the figure might indicate a particular order of execution, in one or more alternative embodiments the operations may be ordered differently. Furthermore, while the figure illustrates multiple steps, it should be recognized that in some implementations some or all of these steps may be combined or executed contemporaneously.

This example illustrates a one-way synchronization initiated by replica A 1502. The replica with which replica A is replicating in this example is replica B 1402, which was introduced and explained previously with reference to FIG. 14. The example shown in FIG. 15 does not describe all operations that may exist in a typical synchronization operation. For example, FIG. 15 does not show how replica A may perform conflict detection after it receives changes from replica B.

In this example, replica A 1502 contains a set of changes 1504 labeled $\Delta_A$, knowledge 1506 labeled $K_A$, and a knowledge vector 1508 that is a shorthand representation of the knowledge 1506. Illustratively, the knowledge vector 1508 of replica A is A12B5, which, as has been explained previously, indicates that replica A has knowledge of changes in replica A up to a twelfth change and knowledge of changes in replica B up to a fifth change. As was stated in the discussion of FIG. 14 previously, replica B 1402 has a set of changes 1406 labeled $\Delta_B$, that include individual changes V, W, X, Y, and Z 1410. Replica B also has knowledge 1408 labeled $K_B$, and a corresponding knowledge vector 1412 that in this case is A11B20, indicating the replica B has knowledge of changes on replica A up to an eleventh change and knowledge of changes on replica B up to a twentieth change.

In operation 1550, replica A 1502 sends a sync request to replica B. Replica A also includes both its knowledge 1506 and specifies a list-based filter $F_1$ 1516. While the filter 1516 in this example may identify a list-based filter, in this case the filter $F_1$, the actual information sent by replica A may not include any actual list membership information. That is, it may be left to the replica that enumerates and returns changes—replica B 1402 in this example—to locate and use the actual membership data associated with the specified filter. This removes from replica A the need to transmit list membership data, at least with the sync request, and enables the synchronization of list membership data to occur at some other time. In another embodiment, replica A and replica B may not synchronize list membership data and may access the same data, for example, at some location on a network accessible by both replica A and replica B. This removes the question of how list membership data is transmitted and kept synchronized between replications to another level or layer and may enable the replicas to assume that the list membership information exists on or is accessible from any replica that requires the data.

In operation 1552, replica B 1402 determines the changes it should send in response to the sync request. As the filter $F_1$ is a retractable filter, in this case implemented as a list-based filter, replica B can examine both changes for items that are in the filter as of the current time, and changes for items that were in the filter at the time represented by replica A's transmitted knowledge of A12B5. If any of these items have changes that are not members of the transmitted knowledge, then replica B may determine that they should be returned to replica A.

The list membership data used by replica B to identify items for which changes should be evaluated may be, in this example, the list membership data 1300 of FIG. 13. Using this data first without regard to the transmitted knowledge—that is, simply by examining the list membership—replica B can determine that items $I_W$, $I_Y$, and $I_Z$ are currently in the filter $F_1$ because these items have entry change IDs without associated exit change IDs. Item $I_X$ has an exit change ID for its only entry change ID, so it is considered to not be in the filter at the time represented by the list membership data. Using this data, replica B knows that any changes to items $I_W$, $I_Y$, and $I_Z$ that are not in the transmitted knowledge should be returned to replica A. In addition, using the transmitted knowledge 1506 of A12B5, replica B can determine that replica A believes that item $I_X$ is also currently in the filter. As was discussed in more detail previously with reference to FIG. 13, $I_X$ entered the filter with change ID A3, which is in replica A's knowledge A12B5 and does not leave the filter until change ID B7, which is not in replica A's knowledge. Therefore, replica A still considers item $I_X$ to be in the filter, and so replica B should send changes to this item, if the changes are not in replica A's knowledge.

Based on the logic discussed in the previous paragraph then, replica B 1402 knows that it should evaluate the possibility of sending changes for items $I_W$, $I_X$, $I_Y$, and $I_Z$. (Item $I_V$ is not in the filter as far as replica A or replica B is concerned, so any change associated with it will not be sent.) Examining the versions associated with the items on replica B, as illustrated in FIG. 14, replica B can see that it should send changes for item $I_W$ (with change ID C3 and change W), item $I_X$ (with change ID B6 and change X), and item $I_Y$ (with change ID B8 and change Y). All three of these items have change IDs that are not in replica A's transmitted knowledge of A12B5. Item $I_Z$ is in the filter and so was also considered, but its most recent change, associated with change ID A9, is in A12B5 and so does not need to be sent.

In operation 1554 then, replica B 1402 returns the identified changes W, X, and Y to replica A 1502, labeled as $\Delta_{F1}$ 1522. Replica B also sends the learned knowledge $K_L$ 1514, which is equal to replica B's current knowledge applied only to those elements in filter $F_1$. As was discussed previously with reference to FIG. 10, replica B may alternatively send a knowledge representation that is not qualified by a filter and leave it to replica A to properly qualify the knowledge representation before making it a part of replica A's knowledge.

In operation 1556, replica A 1502 incorporates the changes returned by replica B into its knowledge store, and updates its knowledge using the returned learned knowledge value $K_L$ 1514. This operates in a similar fashion to the analogous operation 1056 described with reference to FIG. 10. Replica A's changes $\Delta_A$ 1504 are updated to include the changes W, X, and Y, associated with items $I_W$, $I_X$, and $I_Y$ respectively. This may involve conflict detection steps on replica A to determine if any of the received changes conflict with changes already on replica A. These conflict detection steps operate similar to those described previously with reference to FIG. 4 and are not described further here. Replica A also updates its knowledge $K_A$ 1506 so that it includes the $F_1$:A11B20 knowledge fragment and is, in its entirety when the replication is complete, equal to A12B5+$F_1$:A11B20.

Turning now to FIG. 16, shown therein are representations of example data for a property-based filter, to demonstrate a technique called "list materialization. " As was discussed previously, not all filters are retractable, including many common filters, like property-based filters. Non-retractable filters may require additional techniques like, for example, those discussed with reference to FIG. 11, to handle the case when membership in the filters is different at different times. In contrast, retractable filters enable what may be a more elegant solution to these issues. The technique of "list materialization" or "materializing a filter into a list" is defined as any means for transforming a variety of non-retractable filters, like property-based filters, into list-based filters that are retractable. Some techniques for performing list materialization are described below. A list-based filter that results from materializing a non-retractable filter into a list may then be used instead of the non-retractable filter so that techniques like those discussed with reference to FIG. 11 may not need to be used.

To demonstrate one method for materializing a filter into a list, consider the set of item data at time $T_1$ 1602 and the set of item data at time $T_2$ 1604 for an exemplary property-based filter, perhaps like the previously discussed $F_{GREEN}$. Both sets of item data refer to the same items, but at two different times, $T_1$ and $T_2$. The information in the table of items at $T_1$ 1602 and the table of items at $T_2$ 1604 may be a result of normal changes and replications, for example as has been described previously. For example, the color of item $I_Y$ may have been changed by a user from blue to green on replica A at time 10, and so have been accorded the change ID A10, as is illustrated in the set of item data at time $T_2$ 1604.

Turning now to FIG. 17 and continuing the discussion of list materialization, shown therein are representations of list membership data for an exemplary list-based filter generated by materializing a property-based filter for green items.

As the list membership data just after time $T_1$ 1702 illustrates, at some time just after the same time $T_1$ referenced in the set of item data at time $T_1$ 1602 of FIG. 16, the list membership for the materialized filter contains items $I_X$ and $I_Z$. That is, the item data of FIG. 16 has been transformed into a list-based filter that can now be used in any place a retractable or list-based filter is suitable, for example as described previously with reference to FIG. 12 and FIG. 15. No special tracking of changes, as described with reference to FIG. 11, may be necessary. In this example, the list membership data just after time $T_1$ 1702 is generated by evaluating the filter criteria—in this case "is the item green?"—against each item in data set. In this case, as illustrated by the exemplary set of item data at time $T_1$ 1602, item $I_X$ is green, so item $I_X$ is added to the list membership for the list-based filter associated with the list membership data just after time $T_1$ 1702. Similar to item $I_X$, item $I_Z$ is also added to the list membership data because it is also green.

Furthermore, the addition of the item $I_X$ to the list membership data is associated with its own change ID, which is A3 in this example. The addition of item $I_Z$ is accorded change ID A4. The use of these change IDs indicates that this list materialization operation is being performed on replica A. Also note that the use of these change IDs in the list membership means that a single set of change IDs with numerically increasing version values is being shared across two sets of data: the same set of change IDs is used for changes to item data like that illustrated in the set of item data at time $T_1$ 1602 and for changes in list membership data like that illustrated in list membership data just after time $T_1$ 1702.

Now, suppose that some time has passed and that some of the items in the set of item data at time $T_1$ 1602 have been updated so that their values are now represented by the set of item data at time $T_2$ 1604. For some reason—perhaps because a synchronization operation is to be performed soon—replica A has determined that it may be beneficial to materialize the item data into the list-based filter. In a similar fashion to that described previously, each item in the set of item data at time $T_2$ 1604 is evaluated against the exemplary criteria of "is the item green?" and the list membership data just after time $T_2$ 1704 is updated accordingly. In this example, Item $I_X$ is still green and has not changed, so the list membership data for $I_X$ stays the same. Item $I_Y$ is now green, where before it was blue, so item $I_Y$ is added to the list membership data just after time $T_2$ 1704 and the addition is accorded a new change ID A11.

Item $I_Z$ is now blue, where before it was green, and so it is "removed" from the filter. In the context of a list-based filter, "removed" may mean that the data for the particular item to be removed is updated with an exit change ID, in this case the newly accorded change ID of A12. No data for the removed item is actually removed from the list membership data, which enables the filter to remain retractable and continues to make it possible to determine the membership in the filter at a previous time.

Materialization of a filter into a list-based filter, the updating of list membership data in a materialized list-based filter, or the maintenance of any list-based filter by updating list membership data, may in some implementations happen at arbitrary times—it may not need to happen, for example, before every synchronization, after every synchronization, or at any other particular time. If the list membership data of a filter has not been updated before a synchronization operation, the synchronization operation may still complete successfully, but, for example, particular items may not synchronize if they're not in the materialized filter, even if their item data would make them candidates for synchronization. While some changes may not be sent in such a situation, the use of new change IDs when the list membership data is updated can ensure that the changes will be sent at some future time—that is, the use of knowledge ensures that data that is later added to the filter will still be synchronized in a future replication. With that said, in some implementations it may be useful to update list membership data before synchronization so that, for example, all known changes are synchronized sooner rather than later.

The list membership data for a particular list-based filter may in some implementations exist in a single accessible store—for example, perhaps on a globally accessible server. In another common implementation, the list membership data may be synchronized between replicas. In such an implementation, the synchronization of list membership data may happen completely separate from the synchronization of item data. In fact, while the same techniques described herein for synchronizing item data may also be used with list membership data, it is also possible that other synchronization or replication techniques not described herein may be used so that the list membership data can be accessed by any replica from which it is required.

Figure 18:
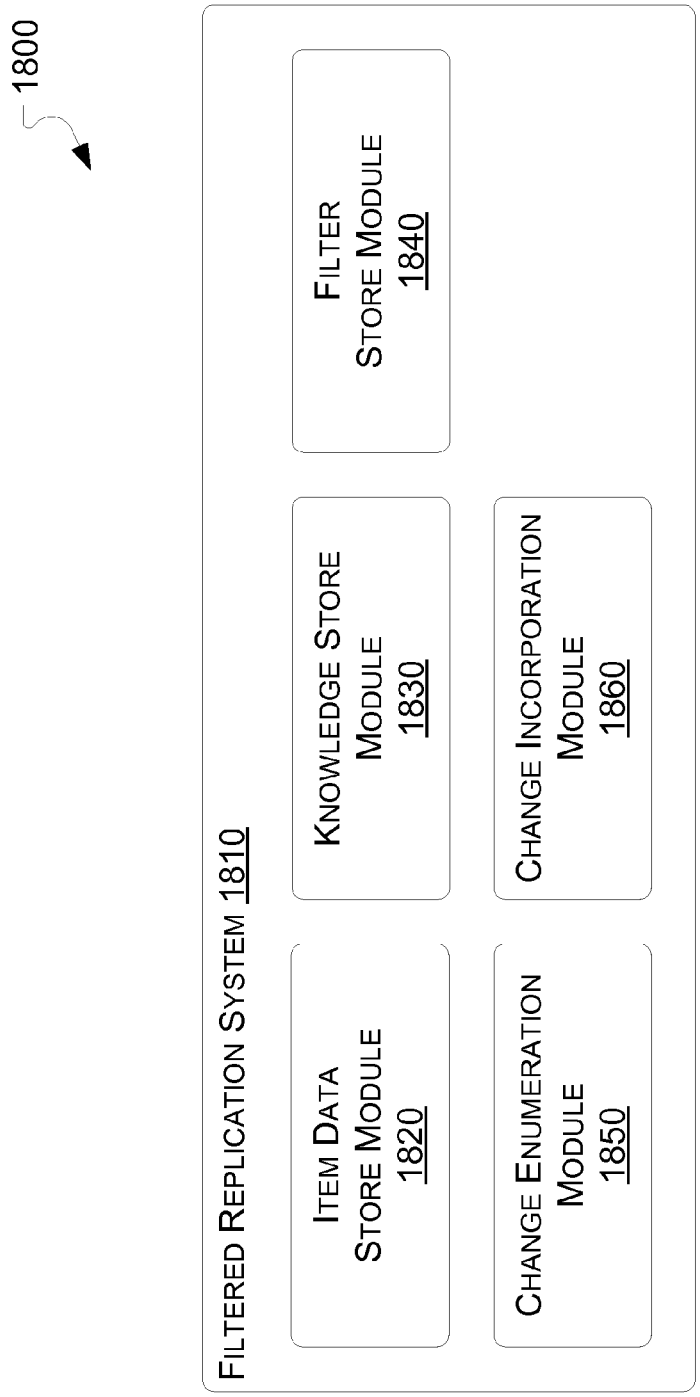
FIG. 18 illustrates one embodiment of a system in which filtered replication might be implemented.

Turning now to FIG. 18, shown therein is one embodiment of a system in which filtered replication might be implemented. Included in the figure is a filtered replication system 1810, an item data store module 1820, a knowledge store module 1830, a filter store module 1840, a change enumeration module 1850, and a change incorporation module 1860. The following description of FIG. 18 is made with reference to other figures. However, it should be understood that the operations described with respect to FIG. 18 are not intended to be limited to being used with the elements illustrated by these other figures.

The item data store 1820 may be configured to store and manage the set of data managed and, in some cases, replicated by the filtered replication system. For example, in an implementation of the filtered replication system 1810 that includes email messages as part of its data, the item data store module 1820 may store and provide access to email message data and other data relevant to storing and accessing email messages, like, for example, email folder information. In another example the data stored by the item data store module 1820 might comprise all persistent data on a computing device, including, for example and without limitation, email messages as described previously, but also computer-readable files of all types and that store all kinds of data. As a non-limiting example with reference to previously discussed figures, the item data store module 1820 might in some implementations store, manage, and provide access to pieces of the item data described with reference to FIG. 9 including, for example and without limitation, the items 916, the item color 920, and/or the changes 910. In the same or other implementations, the item data store 1820 might store information like the set of changes 806 described with reference to FIG. 8. In some implementations the item data store module 1820 may hold just one or multiple versions of particular data items. In other or the same implementations, the item data store module 1820 may store the differences between multiple versions of the same data item. In some embodiments, this may enable different complete versions to be constructed by applying one or more changes to a particular complete version of the data item. In some embodiments, the item data store module may not store item data information itself and may instead provided access to such item data information stored elsewhere.

The knowledge store module 1830 may be configured to store and manage knowledge about the changes and data of which the filtered replication system 1810 is aware. For example, as a non-limiting example with reference to previously discussed figures, the knowledge store module 1830 may in some implementations be configured to store, manage, and provide access to the knowledge 808 of FIG. 8, which, in the example described with reference to FIG. 8, includes the knowledge vector A2B5 and may store any other representation of knowledge. In some embodiments, the knowledge store module may not store knowledge information itself and may instead provided access to such knowledge information stored elsewhere.

The filter store module 1840 may be configured to store and manage data about filters used in replication. Again, as a non-limiting example with reference to previously discussed figures, the filter store module 1840 may in some implementations be configured to store, manage, and provide access to the filter 820 used in the example described with reference to FIG. 8. In the same or other implementation, the filter store module 1840 may store information about filters, like the list membership data 1300 illustrated in FIG. 13, and the list membership data just after time $T_1$ 1702 and list membership data just after time $T_2$ 1704 illustrated in FIG. 17. In some embodiments, the filter store module may not store filter information itself and may instead provide access to such filter information stored elsewhere.

The change enumeration module 1850 may be configured to perform the necessary tasks to receive a request for replication from another replica, identify changes of which the other replica is not aware, and return those changes and any other useful knowledge to the replica that initiated the request. These operations have been discussed in detail previously, including, for example and without limitation, with respect to operation 850, operation 852, operation 854 in FIG. 8 and operation 1250, operation 1252, and operation 1254 in FIG. 12.

The change incorporation module 1860 may be configured to perform the necessary tasks to initiate and transmit a request for replication to another replica, and then, after the other replica has responded, to evaluate the returned data for conflicts and incorporate appropriate changes into the item data store module 1820, knowledge store module 1830, and/or filter store module 1840. These operations have been discussed in detail previously, including, for example and without limitation, with respect to operation 850, operation 854, and operation 856 in FIG. 8 and operation 1250, operation 1254, and operation 1256 in FIG. 12.

The filtered replication system 1810 contains various modules, discussed previously, that perform a variety of tasks and serve a variety of functions associated with replicating data using filters. It should be understood that while the filtered replication system 1810 contains various modules, in one or more alternative implementations, a single module may perform more than one of the tasks or functions associated with modules in the system. For example and without limitation, the item data store module 1820 may in some implementations be relied upon to store all data in the system, including data about items as well as data about knowledge and filters. As another example, and also without limitation, a single module might perform the tasks associated with the change enumeration module 1850 and the change incorporation module 1860. Similarly, in one or more alternative implementations, the modules may perform additional tasks not shown or discussed. Furthermore, in one or more alternative implementations, the modules may reside on more than one computing device. For example and without limitation, in one implementation the change enumeration module 1850 and change incorporation module 1860 may reside on a particular computing device while the item data store module 1820, knowledge store module 1830, and filter store module 1840 reside on one or more other computing devices. In such an implementation, the change enumeration module 1850 and change incorporation module 1860 may access information in these stores using a network or other system capable of providing a communication link. In another exemplary implementation all of the modules may reside on a single computing device. In yet another exemplary implementation, all but the filter store module 1840 may reside on a single computing device, and the filter data provided by the filter store module 1840 may be stored on another computing device and accessed from the filtered replication system 1810 using a network or some other system capable of providing a communication link.

Example Computing Environment

Figure 19:
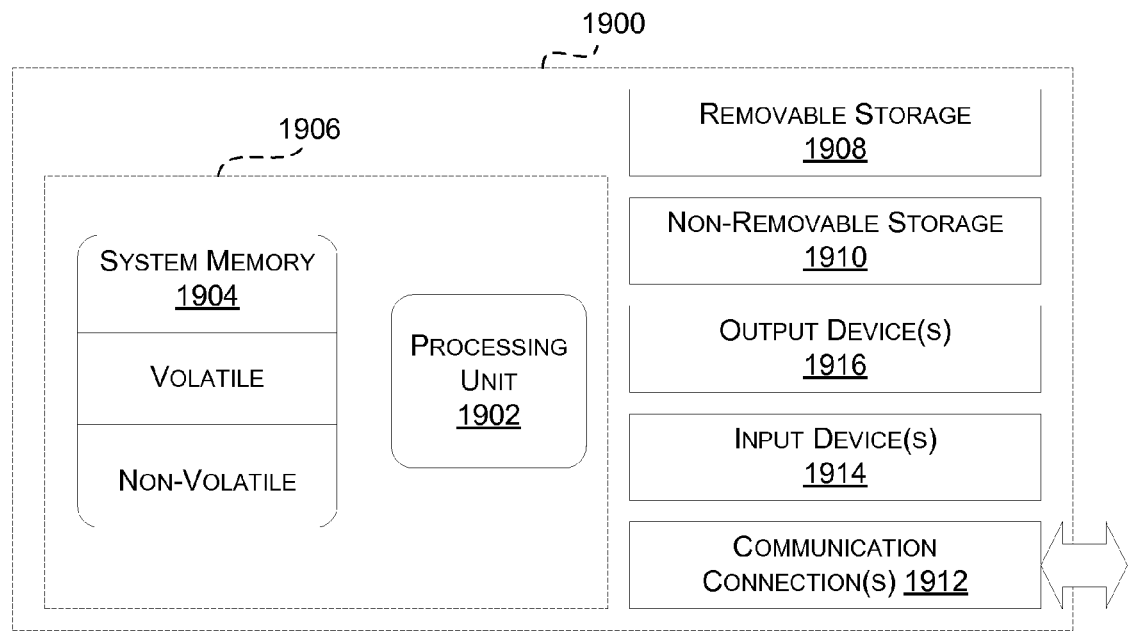
FIG. 19 illustrates an exemplary computer device in which the various technologies described herein may be implemented.

Turning now to FIG. 19, this figure and the related discussion are intended to provide a brief, general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1900 illustrated in FIG. 19.

Generally, program modules include routines, programs, objects, components, data structures, etc., that perform particular tasks or implement particular abstract data types. Tasks performed by the program modules are described previously with the aid of one or more block diagrams and operational flowcharts.

Those skilled in the art can implement the description, block diagrams, and flowcharts in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The system illustrated in FIG. 19 has, in its most basic configuration, a computing device 1900 that includes at least one processing unit 1902 and memory 1904. Depending on the exact configuration and type of computing device, the memory 1904 may be volatile (such as RAM), non-volatile (such as ROM, flash memory, etc.), or some combination of the two. This most basic configuration is illustrated in FIG. 19 by dashed line 1906. Additionally, the computing device 1900 may also have additional features and functionality. For example, the computing device 1900 may also include additional storage (removable and/or non-removable) including, but not limited to, magnetic or optical disks or tape. Such additional storage is illustrated in FIG. 19 by the removable storage 1908 and the non-removable storage 1910.

The computing device 1900 may also contain one or more communications connection(s) 1912 that allow the computing device 1900 to communicate with other devices. The computing device 1900 may also have one or more input device(s) 1914 such as keyboard, mouse, pen, voice input device, touch input device, image input device (like a camera or scanner), and so on. One or more output device(s) 1916 such as a display, speakers, printer, etc. may also be included in the computing device 1900.

Those skilled in the art will appreciate that the technologies described herein may be practiced with computing devices other than the computing device 1900 illustrated in FIG. 19. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like.

The technologies described herein may also be implemented in distributed computing environments where tasks are performed by remote processing devices that are linked through a communications network. In a distributed computing environment, program modules may be located in both local and remote memory storage devices.

While described herein as being implemented in software, it will be appreciated that the technologies described herein may alternatively be implemented all or in part as hardware, firmware, or various combinations of software, hardware, and/or firmware.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

What is claimed is:

1. A method for replicating at least one change to stored data between replicas in a sync community wherein each replica makes changes independently of other replicas in the sync community, comprising:

receiving, at a second replica, a first replica knowledge value that represents knowledge of changes to the stored data that a first replica is aware, and a first filter that identifies a first particular set of data in the stored data, wherein the first replica knowledge value includes a first change identifier and a second change identifier, the first change identifier indicating the first replica is aware of all changes made by the first replica up to the first change identifier, the second change identifier indicating the first replica is aware of all changes made by a third replica up to the second change identifier;

comparing the first replica knowledge value with versions associated with changes to the stored data in the second replica to identify the at least one change known by the second replica that the first replica is not aware, wherein the at least one change is associated with a first particular set of data identified by the first filter;

sending the at least one change to the first replica;

sending, to the second replica, a system knowledge value provided by a knowledge store that represents knowledge of changes to the stored data that a system is aware, and a second filter provided by a filter store that identifies a second particular set of data in the stored data;

receiving at least one received change that exists in the second replica that the system was not aware, wherein the at least one received change is associated with the second particular set of data identified by the second filter;

incorporating the at least one received change into the stored data associated with item data store module;

receiving information that identifies at least one non-filtered change to the stored data that is not represented by the first replica knowledge value and is also not associated with the second particular set of data identified by the second filter according to the second replica; and updating the stored data maintained by the first replica using the information that identifies the at least one non-filtered change, wherein said updating the stored data maintained by the first replica further comprises creating at least one exception in the first replica knowledge value according to the information that identifies the at least one non-filtered change, the at least one exception referencing knowledge of changes to the stored data that the first replica was aware before receiving the at least one change.

2. The method of claim 1, further comprising:
sending a second replica knowledge value that represents knowledge of changes to the stored data of which the second replica is aware to the first replica.

3. The method of claim 1, further comprising:
identifying at least one non-filtered change to the stored data that is not represented by the first replica knowledge value and is also not associated with the first particular set of data identified by the first filter according to the second replica; and
sending information that identifies the at least one non-filtered change to the first replica.

4. The method of claim 1 wherein:
the first filter is a retractable filter; and
the first particular set of data identified by the first filter comprises data identified by a filter criteria applied during the comparing and data identified by the first filter criteria applied as a time represented by the first replica knowledge value.

5. The method of claim 1 further comprising:
a list associated with the first filter that comprises one or more stored data identifiers each identifying a separate piece of data and having at least one version associated with an entry of the piece of data into the first filter.

6. The method of claim 5 wherein at least one of the one or more stored data identifiers also has at least one version associated with an exit of the piece of data from the first filter.

7. The method of claim 5, wherein the list is maintained by:
evaluating a filter criteria; adding a version associated with entry of the piece of data into the first filter when the first filter criteria identifies stored data that is in the first filter; and
adding a version associated with exit of the piece of data from the first filter when the filter criteria identifies stored data that is not in the first filter.

8. The method of claim 7 wherein the list is maintained immediately before or during a sync operation.

9. The method of claim 7 wherein the list is maintained at a time separate from a sync operation.

10. A system for managing and replicating changes to stored data between replicas in a sync community, wherein each replica makes changes independently of other replicas in the sync community, comprising:
a processor;
a memory operatively coupled to the processor;
an item data store module to manage the stored data;
a knowledge store module to manage knowledge of changes to the stored data;
a filter store module to maintain one or more filters that each identify a particular set of data in the stored data;
a change enumeration module to:
receive a first replica knowledge value that represents knowledge of changes to the stored data that a first replica is aware, and a first filter that identifies a first particular set of data in the stored data, wherein the first replica knowledge value includes a first change identifier and a second change identifier, the first change identifier indicating the first replica is aware of all changes made by the first replica up to the first change identifier, the second change identifier indicating the first replica is aware of all changes made by a third replica up to the second change identifier, the changes made by the third replica up to the second change identifier including a first change to a first item and a second change to a second item, the first change and second change corresponding to different change identifiers;
compare the first replica knowledge value with versions associated with changes provided by the item data store module to identify at least one enumerated change known by the system that the first replica is not aware, wherein the at least one enumerated change is associated with a first particular set of data identified by a first filter; and
send the at least one enumerated change to the first replica; and a change incorporation module to:
send, to a second replica, a system knowledge value provided by the knowledge store that represents knowledge of changes to the stored data that the system is aware of, and a second filter provided by the filter store module that identifies a second particular set of data in the stored data;
receive at least one received change that exists in the second replica that the system was not aware, wherein the at least one received change is associated with the second particular set of data identified by the second filter;
incorporate the at least one received change into the stored data associated with item data store module;
receive information that identifies at least one non-filtered change to the stored data that is not represented by the first replica knowledge value and is also not associated with the first particular set of data identified by the first filter according to the second replica; and update the stored data maintained by the first replica using the information that identifies the at least one non-filtered change, wherein updating the stored data maintained by the first replica further comprises creating at least one exception in the first replica knowledge value according to the information that identifies the at least one non-filtered change, the at least one exception referencing the knowledge of changes to the stored data that the first replica was aware before receiving the at least one enumerated change.

11. The system of claim 10 wherein the change enumeration module is further configured to send, to the first replica, the system knowledge value provided by the knowledge store that represents knowledge of changes to the stored data of which the system is aware.

12. The system of claim 10 wherein the change incorporation module is further configured to:

receive a second replica knowledge value that represents knowledge of changes to the stored data which the second replica is aware; and update the system knowledge value so that the system knowledge value represents knowledge of changes to the stored data which the second replica is aware, for only the second particular set of data identified by the second filter.

13. The system of claim 10 wherein the change incorporation module is further configure to:

receive a made-with-knowledge value from the second replica that represents knowledge of changes to the stored data which the second replica was aware when the at least one received change was made on the second replica;

determine that a conflict exists when, for a single piece of the stored data:

a first change has been made on the system;

a second change has been made on the second replica; and a first change ID associated with the first change is not in the made-with-knowledge value; and a second change ID associated with the second change is not in the system knowledge value.

14. The system of claim 10 wherein:

the first filter is a retractable filter; and the first particular set of data identified by the first filter comprises data identified by a filter criteria applied during the comparing and data identified by the filter criteria applied as time represented by the first replica knowledge value.

* * * * *